United States Patent
Chen et al.

(10) Patent No.: US 8,161,413 B2
(45) Date of Patent: Apr. 17, 2012

(54) METHOD AND SYSTEM FOR PROVIDING USER INTERFACE REPRESENTING ORGANIZATION HIERARCHY

(75) Inventors: Chun-Yi Chen, Belmont, CA (US);
Aylin Uysal, Redwood City, CA (US);
Sally Baggett, Healdsburg, CA (US);
Lulit Bezuayehu, Oakland, CA (US);
Prashant Singh, Burlington, MA (US);
Peter Budavari, Mill Valley, CA (US);
Brendon Glazer, Everett, MA (US);
Bret Hekking, Acton, MA (US); Julian Challenger, Reading (GB)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 12/563,069

(22) Filed: Sep. 18, 2009

(65) Prior Publication Data
US 2011/0055771 A1    Mar. 3, 2011

Related U.S. Application Data

(60) Provisional application No. 61/239,043, filed on Sep. 1, 2009, provisional application No. 61/239,033, filed on Sep. 1, 2009.

(51) Int. Cl.
*G06F 3/048* (2006.01)
*G06F 3/00* (2006.01)

(52) U.S. Cl. ........ 715/854; 715/855; 715/712; 715/762; 715/764

(58) Field of Classification Search .......... 715/853–855, 715/711–713, 762, 764
See application file for complete search history.

(56) References Cited

U.S. PATENT DOCUMENTS

| | | | |
|---|---|---|---|
| 5,798,769 A | 8/1998 | Chiu et al. | |
| 5,850,221 A | 12/1998 | Macrae et al. | |
| 5,937,163 A | 8/1999 | Lee et al. | |
| 5,953,724 A | 9/1999 | Lowry | |
| 6,128,617 A | 10/2000 | Lowry | |
| 6,154,750 A | 11/2000 | Roberge et al. | |

(Continued)

FOREIGN PATENT DOCUMENTS

WO    WO 2005/084285 A2    9/2005

(Continued)

OTHER PUBLICATIONS

U.S. Appl. No. 12/490,250, filed Jun. 23, 2009, Chen et al.

(Continued)

*Primary Examiner* — Tadeese Hailu
(74) *Attorney, Agent, or Firm* — Kilpatrick Townsend & Stockton LLP

(57) ABSTRACT

Method and system for providing graphical user interface for displaying hierarchical charts. According to various embodiments, the present invention provides a graphical user interface where relational data are displayed as one or more hierarchical charts. A hierarchical chart includes a plurality of nodes that are organized according to the hierarchical chart. Each of the nodes is associated with a data record that contains multiple level of information. At different view level, different amount of information for the nodes are displayed. A view control function is provided for the graphical user interface. If none (or all) of the nodes are selected, each nodes display the same level of information based associated with a particular view level. If only few of the nodes are selected, only the selected nodes responds changes in view level when being displayed.

20 Claims, 17 Drawing Sheets

U.S. PATENT DOCUMENTS

| | | | |
|---|---|---|---|
| 6,259,451 | B1 | 7/2001 | Tesler |
| 6,496,208 | B1 | 12/2002 | Bernhardt et al. |
| 6,732,114 | B1 | 5/2004 | Aamodt et al. |
| 6,859,823 | B1 | 2/2005 | Nishihara et al. |
| 6,944,830 | B2 | 9/2005 | Card et al. |
| 6,990,638 | B2 | 1/2006 | Barksdale et al. |
| 7,080,077 | B2 | 7/2006 | Ramamurthy et al. |
| 7,149,959 | B1 | 12/2006 | Jones et al. |
| 7,363,593 | B1 | 4/2008 | Loyens et al. |
| 7,412,647 | B2 | 8/2008 | Sellers et al. |
| 7,574,659 | B2* | 8/2009 | Szabo .......................... 715/738 |
| 2003/0218640 | A1 | 11/2003 | Noble-Thomas |
| 2004/0169688 | A1* | 9/2004 | Burdick et al. ............... 345/854 |
| 2004/0205594 | A1 | 10/2004 | Arora |
| 2005/0071765 | A1 | 3/2005 | Hallisey et al. |
| 2005/0108260 | A1 | 5/2005 | Wenn et al. |
| 2005/0120005 | A1 | 6/2005 | Tesch et al. |
| 2006/0001647 | A1 | 1/2006 | Carroll |
| 2006/0169688 | A1 | 8/2006 | Mori et al. |
| 2007/0011316 | A1 | 1/2007 | Araki et al. |
| 2007/0100848 | A1 | 5/2007 | Vignet |
| 2008/0028338 | A1 | 1/2008 | Kodosky et al. |
| 2008/0162616 | A1 | 7/2008 | Gross |
| 2009/0113350 | A1* | 4/2009 | Hibino et al. ................. 715/853 |

FOREIGN PATENT DOCUMENTS

| | | | |
|---|---|---|---|
| WO | WO 2007/111951 | A2 | 10/2007 |
| WO | WO 2008/042677 | A2 | 10/2008 |

OTHER PUBLICATIONS

"AA OrgChart Webpart." at URL: http://www.aasoftech.com/Products/OrgChartwebpart/Default.asp, downloaded Nov. 20, 2008; Copyright 1997-2007, AASoftech Inc, 1 page.

"Chapter 2: A Tutorial Introduction to Leo," at URL: http://webpages.charter.net.edramleo/intro.html#clones-views, downloaded Nov. 17, 2008, 4 pages.

"Create multiple Views with on one node with paging," Jan. 5, 2008, at URL: http://drupal.org/node/85720, downloaded Nov. 17, 2008, 3 pages.

U.S. Appl. No. 12/492,084, filed Jun. 23, 2009, Chen et al.
U.S. Appl. No. 12/563,071, filed Sep. 18, 2009, Chen et al.
U.S. Appl. No. 12/563,075, filed Sep. 18, 2009, Chen et al.
U.S. Appl. No. 12/563,082, filed Sep. 18, 2009, Chen et al.
U.S. Appl. No. 12/563,085, filed Sep. 18, 2009, Chen et al.

"Different Context Menus depending on selected Node in Tree View-Xtreme Visual Basic Talk," at URL: http://www.xtremevbtalk.com/showthread.php?t=85288, downloaded Nov. 18, 2008, 3 pages.

Dill et al., "A Continuously Variable Zoom for Navigating Large Hierarchical Networks," at URL: http://ieeexplore.ieee.org/Xplore/login.jsp?url=/iel2/3184/9019/00399869.pdf?temp=x, 1994, 5 pages.

"Discussion Forum: Ittoolbox Groups Regarding to organization chart in asp.net" at URL: http://c.ittoolbox.com/groups/technical-functional/csharp-1/regarding-to-organization-chart-in-aspnet-2191857, downloaded Nov. 20, 2008, Copyright 1998-2008, CEB Toolbox, Inc., 2 pages.

"Global View Mode," http://www.ilog.com/documentation/elixir10/en-US/Content/Visualization/Documentation/Elixir/_pubskel/ps_elixir82.html, downloaded Nov. 20, 2008; Copyright 1987-2008, ILOG S.A, 3 pages.

"Google Organizational Charts," Cogmap, at URL: http://www.cogmap.com/chart/google, downloaded Nov. 13, 2008, 5 pages.

"Grouping Data in a Report" at URL: http://msdn.microsoft.com/en-us/library/ms155903(SQL.90).aspx, downloaded Nov. 20, 2008, Copyright 2008, Microsoft Corporation, 2 pages.

"How to Draw Organizational Charts," EDrawsoft, at URL: http://www.edrawsoft.com/How-to-draw-org-charts.php, Copyright 2004-2008, EDrawSoft downloaded Nov. 13, 2008, 2 pages.

"INAPORT Enterprise Data Integration for GoldMine," at URL: http://www.databridgenow.com/what_we_do/inaport.pdf, InaPlex Limited 2002, 6 pages.

"InfoPath Team Blog: recursive Controls support in Infopath," 2003 SP1 at URL: http://blogs.msdn.com/infopath/archive/2004/06/24/164988.aspx;copy, downloaded Dec. 15, 2008, Copyright 2008, Microsoft Corporation, 4 pages.

"Integrated Multi-Views," Journal of Visual Languages & Computing, Abstract, Jun. 1998, vol. 9, Issue 3, at URL: http://www.sciencedirect.com/science?_ob=ArticleURL&_udi=B6WMM-45J5BMS-P&_user=10&rdoc=1&_fmt=&orig=search&_sort=d&view=c&_acct=C000050221&_version=1&_urlVersion=0&_userid=10&md5=b16ea573128ea20191cc62fa49df0c46, Copyright 1998, Academic Press, 2 pages.

"JSF portlet with JWL Data Tree Component," at URL: http://www.ibm.com/developerworks/forums/thread.jspa?threadID=161906, downloaded Nov. 18, 2008, 4 pages.

"KNIME Quick Start Guide," at URL: http://www.knime.org/quickstartguide.html, downloaded Nov. 17, 2008; Copyright 2003-2008, University of Konstanz, Germany,10 pages.

"KWizCom Organization Chart web part Installation & User Guide" Copyright 2005, KWizCom LTD, pp. 1-22.

"McGill Organizational Chart" McGill Organizational Chart Manual-Version 2 Aug. 2005; 11 pages.

Nation et al., "Browse Hierarchical Data with the Degree of Interest Tree," at URL: http://www2.parc.com/istl/groups/uir/publications/items/UIR-2002-12-Nation-CHI2002-DOIDemo.pdf, downloaded 2008, 2 pages.

"Organization Chart," at URL: http://www.aasoftech.com/Demo1/3LevelChart.htm, downloaded Feb. 2, 201; 1 page.

"Organization charts from Office 2000 programs appear different in Office XP programs," at URL: http://support.microsoft.com/kb/293615, downloaded Nov. 20, 2008; Copyright 2008, Microsoft, 4 pages.

"Organization Chart" http://www.12manage.com/methods_organization_chart.html, downloaded Nov. 20, 2008, Copyright 2008 12manage, 3 pages.

"Organization Chart," at URL: http://www.longbowcg.com/home/services/downloads/coursewarevol2pdf.pdf, downloaded on or before Oct. 2010, 5 pages.

"OrgPlus Professional Tour: 7. Automatically format charts based on the data they contain" at URL: http://www.orgplus.com/products/orgplus-professional/orgplus-professional-tour.htm#, downloaded Nov. 17, 2008, 2000-2008, Copyright HumanConcepts. 1 page.

"OrgPlus Professional Tour: 6. Show chart data in multiple views" at URL:http://www.orgplus.com/products/orgplus-professional/orgplus-professional-tour.htm#, downloaded Nov. 20, 2008, Copyright 2000-2008, HumanConcepts, 1 page.

OrgPlus Professional Tour 5. Create multiple customized chart views to present employee data differently, at URL:http://www.orgplus.com/products/orgplus-professional/orgplus-professional-tour.htm#, downloaded Nov. 20, 2008, 2000-2008, Copyright HumanConcepts, 2 pages.

"Org Chart Test" at URL: http://sandpit.reitsma.net.au/googleOrg/OrgChartTest.html; downloaded Dec. 15, 2008, 1 page.

Perkins, "Create and organizational chart with HTML, VML, and XML," downloaded Dec. 15, 200, 3 pages.

"1. Portal Tour—Chapter 2. User Guide," at URL: http://www.polarion.com/products/alm/help/ug_quicktour.html, downloaded Nov. 20, 2008; 9 pages.

Plumlee et al.,"Zooming, Multiple Windows, and Visual Working Memory," at URL: http://ccom.unh.edu/vislab/PDFs/Zoom_Multi_VisualWM_final.pdf, 2008; 10 pages.

"Quixa Organisation Chart," at URL: http://www.quixa.com/bpmsuite/orgchart.asp, downloaded Nov. 20, 2008; Copyright 2008, Qiuxa Solutions, 1 page.

"QMF_V8-DB2 QMF Visionary Developer's Guide—Organization chart example," http://publib.boulder.ibm.com/infocenter/dzichelp/v2r2/index.jsp?topic=/com.ibm.qmf.doc.visd.dsqvdmst50.htm, downloaded Nov. 13, 2008, Copyright 1982, 2004, IBM Corporation; 3 pages.

"Readerware views," at URL: http://www.readerware.com/help/rwViews.html, downloaded Nov. 20, 2008; Copyright 1999-2008, Readerware Corporation, 3 pages.

"Sage Abra OrgPlus Professional" Copyright 2007, Sage Software, 2 pages.

"Support Organization Chart" at URL: http://resources2.visual-paradigm.com/index.php/release-vp33/55-vp33/91-org-chart.pdf, Last updated Aug. 11, 2008, 5 pages.

Schaffer et al., at URL: "Navigating Hierarchically Clustered Networks Through Fisheye and Full-Zoom Methods," Fisheye versus Full Zoom Views, Mar. 24, 1998, pp. 1-20.

Stolte et al., "Multiscale Visualization Using Data Cubes," at URL: http://graphics.stanford.edu/papers/pan_zoom/paper.pdf, downloaded 2008, 8 pages.

TreeTable—Java applet combines grid and tree view, at URL: http://www.advancescripts.com/detailed/3201.html, downloaded Nov. 20, 2008; Copyright 2006, AdvanceScripts™, 2 pages.

"TreeView Nodes and ContextMenuStrip" at URL:http://www.devnewsgroups.net/group/microsoft.public.dotnet.framework.windowsforms/topic53850.aspx, downloaded Nov. 18, 2008, 5 pages.

"The Most Trusted Name in Enterprise Organizational Charting and Reporting," OrgPublisher, at URL:http://www.ilog.com/documentation/elixir10/enUS/Content/Visualization/Documentation/Elixir/_pubskel/ps_elixir82.html, downloaded Nov. 20, 2008, 2 pages.

"Understanding Data Graph Window Areas," at URL:http://docs.hp.com/en/B6454-97413/ch08s02.html, downloaded Nov. 18, 2008; Hewlett-Packard Development Company 2000, L.P, 3 pages.

"Welcome to Defura Infotech! Dynamic Org chart and Form Designer Tools," at URL: http://jayankv.com/OrgChartDetails.aspx, downloaded Nov. 13, 2008, Copyright 2007, Defure Infotech, 3 pages.

Zhao et al., "Elastic Hierarchies: Combining Treemaps and Node-Link Diagrams," at URL: http://www.dgp.toronto.edu/~sszhao/paperInforVis05_ElasticHierarchy.pdf, downloaded 2008, 8 pages.

* cited by examiner

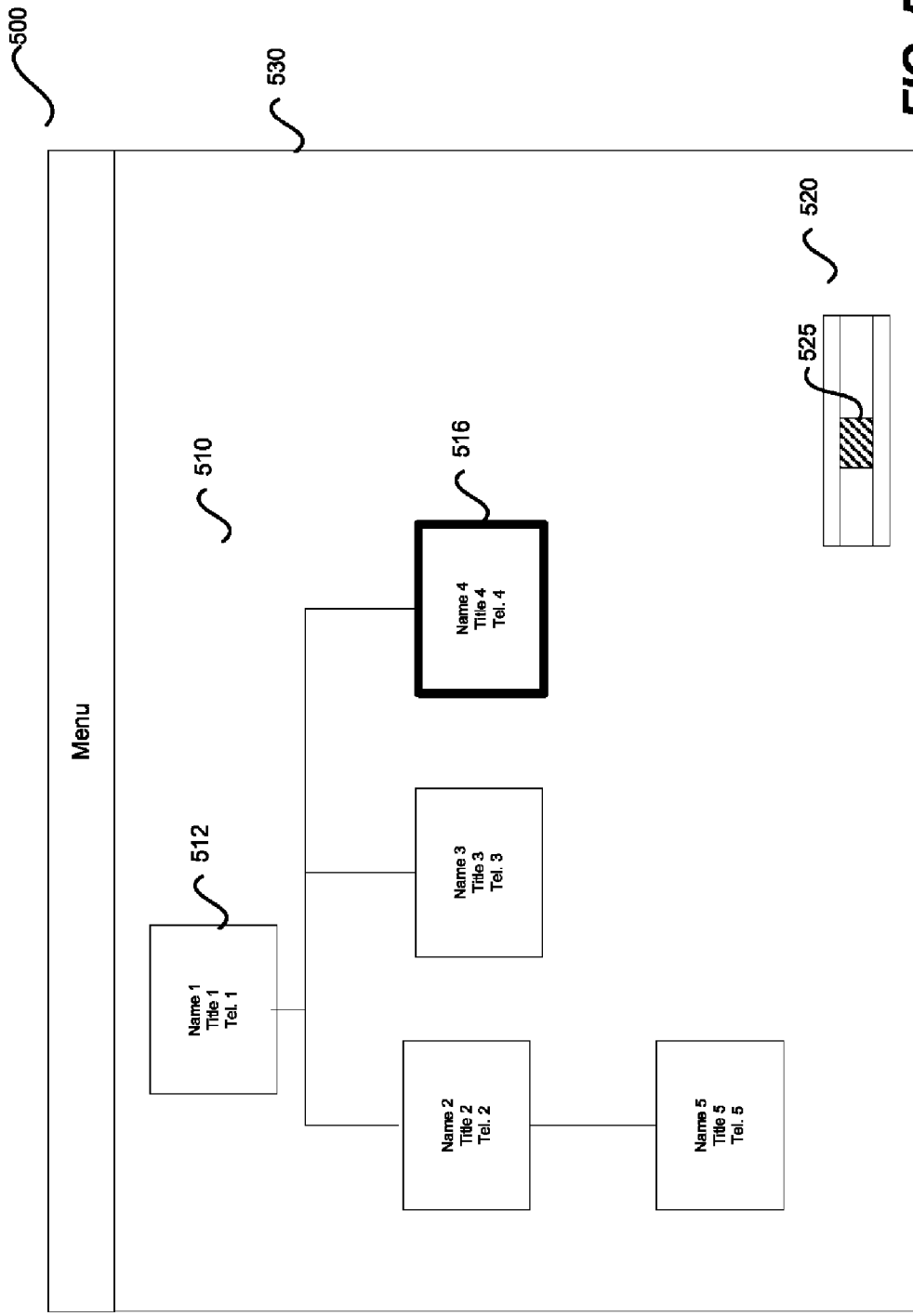

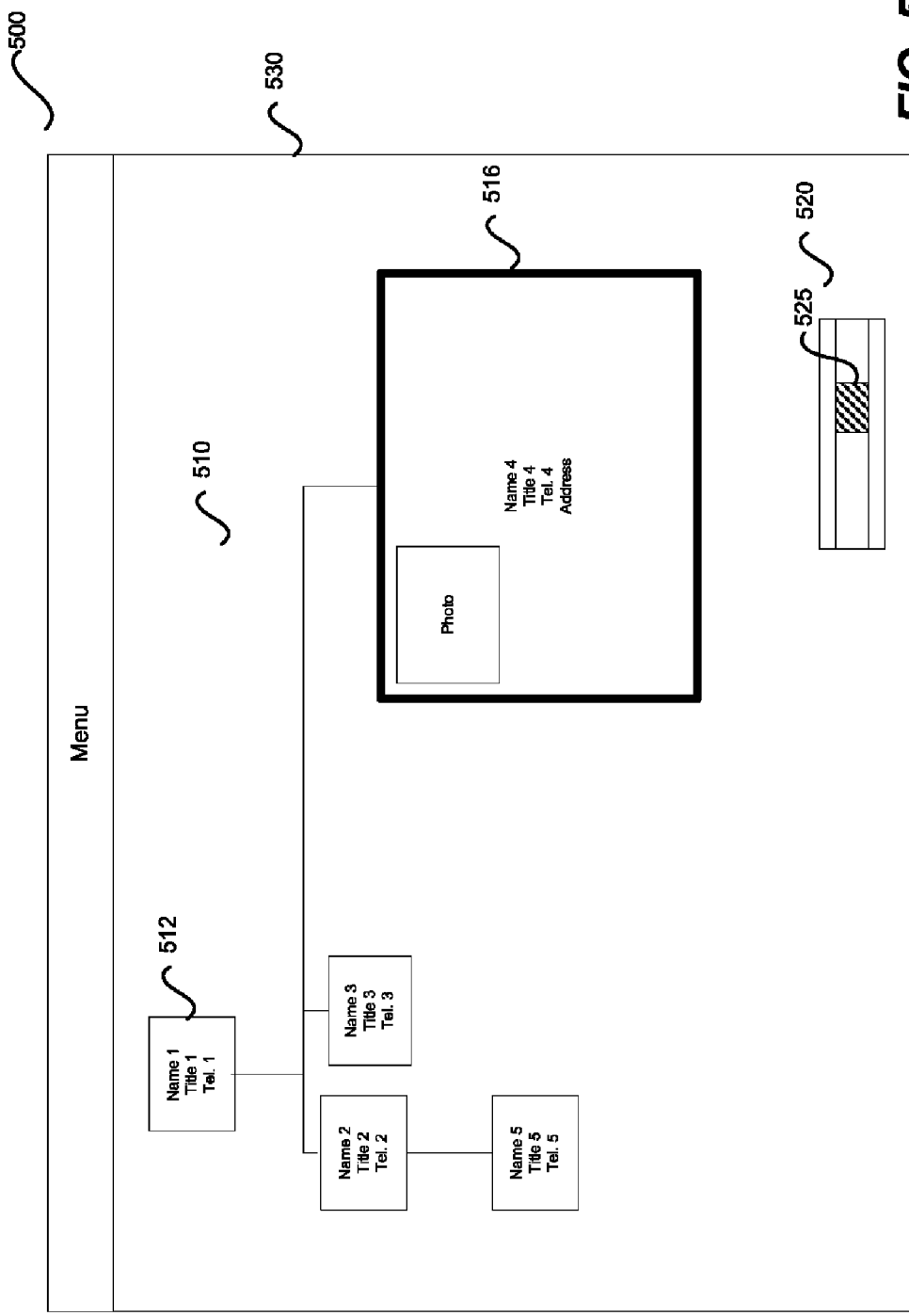

METHOD AND SYSTEM FOR PROVIDING USER INTERFACE REPRESENTING ORGANIZATION HIERARCHY

CROSS-REFERENCES TO RELATED APPLICATIONS

The present application claims the benefit and priority under 35 U.S.C. 119(e) from the following U.S. Provisional Applications, the entire contents of which are herein incorporated by reference for all purposes:

(1) U.S. Provisional Application No. 61/239,043, filed Sep. 1, 2009, entitled METHOD AND SYSTEM FOR PROVIDING USER INTERFACE REPRESENTING ORGANIZATION HIERARCHY;

(2) U.S. Provisional Application No. 61/239,033, filed Sep. 1, 2009, entitled SYSTEM AND METHOD FOR PROVIDING GRAPHICAL USER INTERFACE DISPLAYING MULTIPLE VIEWS;

The present application also incorporates by reference for all purposes the entire contents of U.S. application Ser. No. 12/563,071 filed Sep. 18, 2009, entitled SYSTEM AND METHOD FOR PROVIDING GRAPHICAL USER INTERFACE DISPLAYING MULTIPLE VIEWS.

BACKGROUND OF THE INVENTION

Embodiments of the present invention are directed to user interfaces and more particularly to techniques for providing user interface representing hierarchy information.

In today's information age, an increasing amount of data is being collected and stored every second. Satellites orbiting earth record information and photograph our planet everyday, and they send information and photographs back to earth. Millions of computers on the Internet collect all types of information, ranging from network usage to marketing data. All types of organizations, large and small, store information such as personnel data, operational costs, etc. New tools are being invented to make collecting data easier, faster, and more convenient than ever before.

Data, no matter how it is collected, is only meaningful and useful to people when logically organized and stored. For example, computers often rely on data structures to store data in predefined fields. For large amounts of data, people usually rely on databases, where structured collections of data and/or records are stored in computer systems in accordance to predefined rules and/or database models.

Relationship models, hierarchy models, and network models, are common models for use in representing relationships among entities of information stored in databases. Typically, a database relies on database software to organize and manage data and/or entities of information. For example, database software organizes and stores data and/or records using various types of database models.

Graphical user interface ("GUI") is a helpful way for displaying data and showing the relationships thereof. Numerous conventional graphical user interfaces are capable of displaying records from a database in a hierarchical view. For example, Oracle Corporation offers many software tools for displaying organization charts in a hierarchical view, the organization chart being a representation of data selected from a database. For example, nodes representing entities and links representing relationships among these entities are displayed as a hierarchical chart on a GUI. Unfortunately, merely displaying hierarchical information using conventional techniques is inadequate for many applications.

Therefore, new and improved graphical user interfaces for displaying hierarchical information are desired.

BRIEF SUMMARY OF THE INVENTION

Embodiments of the present invention provide techniques for displaying hierarchy information. The hierarchical information may be displayed using nodes and links, where each node represents an entity or concept and a link between two nodes depicts the hierarchical relationship between the two nodes or concepts/entities represented by the two nodes. In an embodiment of the invention, the GUI enables a user to select one or more of the displayed nodes and change the contents displayed for the selected nodes. Multiple levels may be associated with a displayed node, with each level associated with content to be displayed in the node. Techniques are provided that enable a user to change the content displayed in one or more of the selected nodes by changing the level of display for the one or more nodes.

According to various embodiments, the present invention provides a graphical user interface where relational data is displayed as one or more hierarchical charts. A hierarchical chart includes a plurality of nodes that are organized according to the hierarchical chart. Each of the nodes is associated with a data record that contains multiple levels of information. At different view levels, different amounts of information for the nodes are displayed. A view control function is provided for the graphical user interface. If none, or all, of the nodes are selected, each node displays the same level of information based on a particular view level. If only a few of the nodes are selected, only the selected node responds with changes in the view level when being displayed.

In various embodiments, nodes are included in a hierarchical chart, and the relationship among the nodes is indicated by links between the nodes. Each of the nodes is associated with multiple entries of information. The entries of information are associated with view levels, which are user selectable. The view levels of one or more selected nodes may be changed in response to user inputs. In one embodiment, the amount of information displayed on the selected nodes changes when the view level is changed. For example, in view level 1, the node displays name and title; in view level 2, the node displays name, title, and home address; in view level 3, the node displays name, title, home address, and hobbies. In another embodiment, a different set of information can be displayed on the selected nodes when the view level changes. For example, in view level 1, the name and title is displayed; in view level 2, the name and home address are displayed; in view level 3, the name and hobbies are displayed.

In one embodiment, the levels and associated content for a node may be such that the amount of information associated with the levels varies. In such an embodiment, changing the level for a selected node results in a change in the amount of information displayed in the selected node. Accordingly, the user can alter the view of information displayed in a node by changing the level associated with the node.

According to an embodiment, the present invention provides a method for providing a user interface wherein information items are displayed in a hierarchy. The method includes providing a database, the database being stored in a memory, the database including a plurality of records, the plurality of records being related to one another according to a hierarchy, each of the plurality of records including a plurality of entries, the plurality of entries corresponding to a set of view levels, the set of view levels including a first view level and a second view level and a third view level, the plurality of records including a first record and a second record and a third record, the first record including a first entry and a second entry and a third entry, the second record including a fourth entry and a fifth entry and a sixth entry, the third record including a seventh entry and an eighth entry and a ninth entry. The method also includes providing a display. Further, the method includes providing a user input module. The method includes providing a processor. The method also includes obtaining the plurality of records from the database by the processor. The method further includes providing a user interface on the display, the user interface including a control region and a display region, the control region including a view control field. In addition, the method includes displaying the plurality of records at the first view level obtained by the processor on the display region of the user interface, the first entry and the fourth entry and the seventh entry being shown at the first view level, one or more records being selectable by a user using the user input module. The method also includes storing selection states of the plurality of records if one or more of the recorded are selected. Furthermore, the method includes receiving a first user input from the user input module, the first user input indicating the second view level being selected. The method also includes displaying each of the plurality of records at the second view level if the selection states indicate that none the plurality of records is selected. The method further includes displaying the first record at the second view level and the second record at the first view level if the selection states indicate that only the first record is selected, the first entry and the second entry being displayed at the second view level, the fifth entry being invisible at the first view level, the fourth entry being displayed at the first view level. The method also includes displaying the first record and the second record at the second view level and the third record at the first view level if the selection states indicate that only the first record and the second record are selected, the first entry and the second entry and the fourth entry and the fifth entry being displayed at the second view level, the seventh entry being displayed at the first view level, the eighth entry being invisible at the first view level. The method further includes displaying the first record at the third view level and the second record at the first view level if the third view level is selected, the selection states indicate that the first record is selected, the first entry and the second entry and the third entry being displayed at the third view level, the sixth entry being invisible.

According to another embodiment, the present invention provides a method for providing a user interface wherein information items are displayed in a hierarchy. The method includes providing a database, the database being stored in a memory, the database including a plurality of records, the plurality of records being related to one another according to a hierarchy, each of the plurality of records including a plurality of entries. The method also includes a plurality of records including a first record and a second record and a third record, the first record including a first entry and a second entry and a third entry, the second record including a fourth entry and a fifth entry and a sixth entry, the third record including a seventh entry and an eighth entry and a ninth entry. The method also includes determining a correspondence between the plurality of entries and a set of view levels, the set of view levels including a first view level and a second view level and a third view level. The method further includes providing a display and providing a user input module. The method also includes providing a processor. The method further includes obtaining the plurality of records from the database by the processor. The method additionally includes providing a user interface on the display, the user interface including a control region and a display region, the control region including a view control field. Furthermore, the method includes displaying the plurality of records at the first view level obtained by the processor on the display region of the user interface, the first entry and the fourth entry and the seventh entry being shown at the first view level, one or more records being selectable by a user using the user input module. Additionally the method includes storing selection states of the plurality of records if one or more of the records are selected. The method also includes receiving a first user input from the user input module, the first user input indicating the second view level being selected. The method further includes displaying each of the plurality of records at the second view level if the selection states indicate that none of the plurality of records is selected. The method also includes displaying the first record at the second view level and the second record at the first view level if the selection states indicate that only the first record is selected, the first entry and the second entry being displayed at the second view level, the fifth entry being invisible at the first view level, the fourth entry being displayed at the first view level. The method additionally includes displaying the first record and the second record at the second view level and the third record at the first view level if the selection states indicate that only the first record and the second record are selected, the first entry and the second entry and the fourth entry and the fifth entry being displayed at the second view level, the seventh entry being displayed at the first view level, the eighth entry being invisible at the first view level. The method also includes displaying the first record at the third view level and the second record at the first view level if the third view level is selected if the selection states indicate that the first record is selected, the first entry and the second entry and the third entry being displayed at the third view level, the sixth entry being invisible.

According to yet another embodiment, the present invention provides a system for providing a graphical user interface. The system includes a display that is configured to provide a user interface on the display, the user interface including a control region and a display region, the control region including a view control field. The system also includes a user input module. The system additionally includes a memory and a processor, the processor is configured to obtain a plurality of records from a database. The system further includes a display, the display being adapted to displaying the plurality of records at a first view level obtained by the processor on the display region of the user interface, a first level of information of the records being displayed at the first view level, one or more records being selectable by a user using the user input module. The memory stores selection states of the plurality of records if one or more of the records are selected. The user input module is adapted to receive a first user input indicating the second view level being selected. The display is updated for displaying each of the plurality of records at the second view level if the selection states indicate that none of the plurality of records is selected. The display is updated for displaying a first record at the second view level and a second record at the first view level if the selection states indicate that only the first record is selected.

There are many other embodiments as well.

BRIEF DESCRIPTION OF THE DRAWINGS

FIGS. 5A-5C are simplified diagrams illustrating a view control function with automatic size control according to embodiments of the present invention.

DETAILED DESCRIPTION OF THE INVENTION

Figure 1:
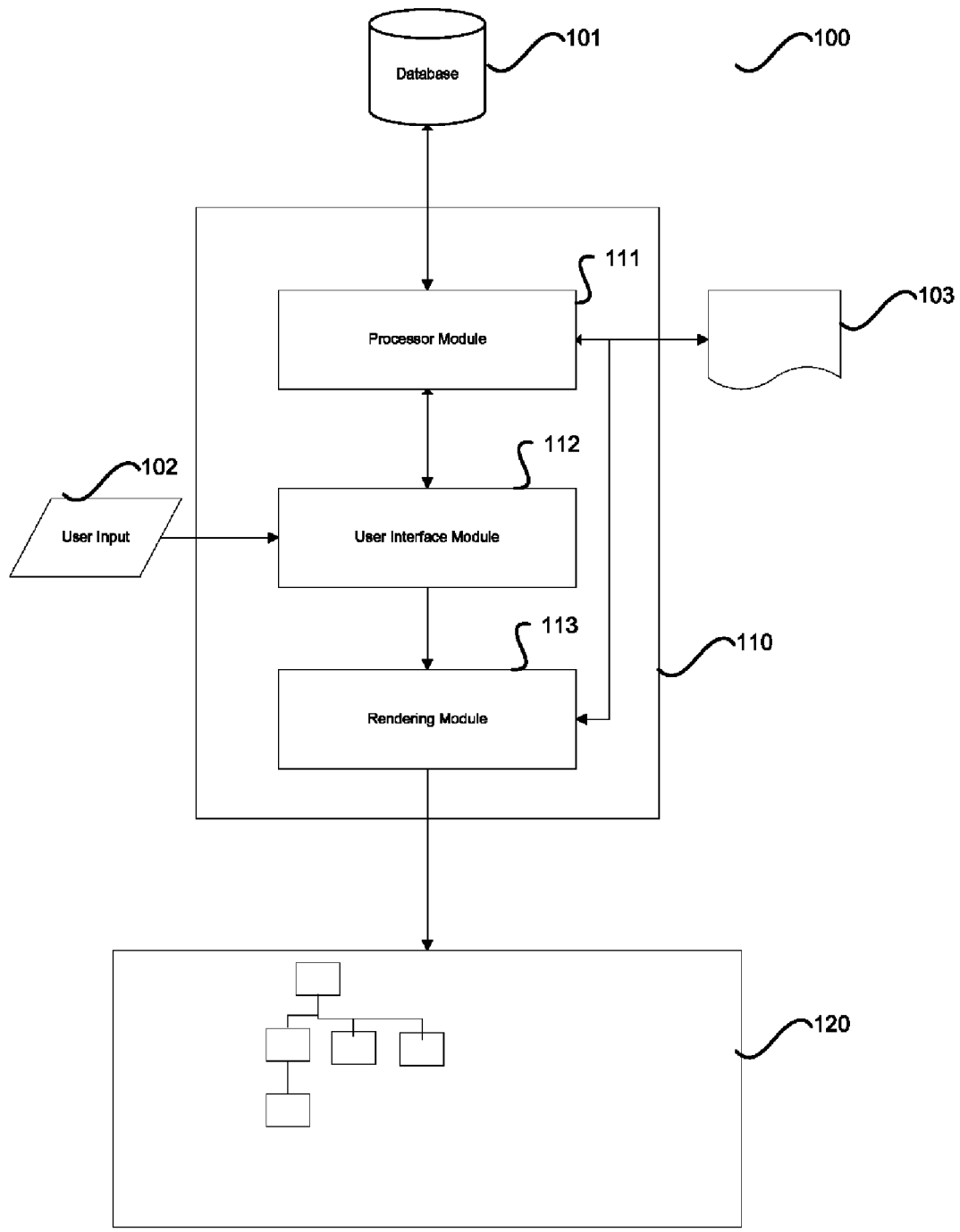
FIG. 1 is a simplified diagram illustrating a conventional graphical user interface.

Embodiments of the present invention provide techniques for displaying hierarchy information. The hierarchical information may be displayed using nodes and links, where each node represents an entity or concept and a link between two nodes depicts the hierarchical relationship between the two nodes or concepts/entities represented by the two nodes. In an embodiment of the invention, the GUI enables a user to select one or more of the displayed nodes and change the contents displayed for the selected nodes. Multiple levels may be associated with a displayed node, with each level associated with content to be displayed in the node. Techniques are provided that enable a user to change the content displayed in one or more selected nodes by changing the levels for the one or more nodes.

As described above, various types of conventional graphical interfaces have been used to display hierarchical information items on computer, many of which offer functions to allow users to view information at difference sizes. For example, by viewing an organization hierarchy chart from one level to another, the viewing size for the same text change from one size to another (e.g., changing from size 12 font to size 24 font).

Changing viewing size of a hierarchical chart, as afforded in conventional systems, is certainly a useful feature. However, this type of conventional viewing merely allows enlargement of text and/or graphics for better visibility or shrinking for fitting a chart in a display area; the conventional viewing function in GUI fails to display different levels of information at different view levels.

Therefore, it is to be appreciated that in various embodiments, the present invention provides a GUI for displaying a plurality of nodes (e.g., information items representing a plurality of entities that are stored in a database) in a hierarchical order, in which a user is able to view the nodes at different view levels, and entries of one or more records are displayed based on view level. For example, a node contains personnel information. At view level 1, only the name is displayed. At view level 2, both the name and photo of the person are displayed. At view level 3, name, photo, job title, and contact information are all displayed. In such a manner, a user is able to view different levels of information details at various view levels. For example, by increasing from one view to the next, additional information is displayed. In an alternative embodiment, a different set of information is displayed when the view level is changed. For example, by changing from level 1 to level 2, the personnel information changes from contact information to employment information.

In an embodiment, users are afforded a GUI that offers advanced viewing capability so different levels of information are displayed at various view levels. It is to be appreciated that for viewing information, the view function provided by the present invention is more useful and meaningful when compared to a conventional view, which as discussed earlier offers no more than merely enlarging display size without actually changing the amount of information that is displayed. In addition, embodiments of the present invention allow users to change view levels of selected elements of a hierarchical chart, in contrast to the global view level change functionality used in conventional techniques.

FIG. 1 is a simplified diagram illustrating data flow for processes according to embodiments of the present invention. This diagram is merely an example, which should not unduly limit the scope of the claims. One of ordinary skill in the art would recognize many variations, alternatives, and modifications.

As shown in FIG. 1, a system 100 comprises the following components:
1. a database 101;
2. a processor module 111;
3. a user interface module 112;
4. a rendering module 113; and
5. a display 120.

As an example, the processor module 111, the user interface module 112, and the rendering module 113 are parts of a controller module 110.

The database 101 is connected to the controller module 110. Depending on the application, the database 101 may implemented as structure data stored on a local memory device, such as hard disk, flash memory, etc. In one embodiment, the database 101 is stored at a network location.

Among other features, the database 101 stores data that represents various entities that are related to one another. The database 101 stores data representing the relationship among these entities. Each of these entities may be associated with one or more attributes. In certain embodiments, the one or more attributes are associated with predefined view levels. For example, an entity in the database 101 represents a manager in a personnel database, and the manager has attributes that include name, address, salary, title, etc. The name display is associated with level 1, address display is associated with level 2, and so on.

The processor module 111 is configured to provide information obtained from the database 101. For example, the processor module 111 retrieves both entities, data and relationship data mentioned above, and process this data. In various embodiments, the processor module 111 determines level information for each of the entities in the database and stores the level information using the status indicator 103.

Once the processor module 111 processes the information from the database 101, the processor module 111 generates a hierarchical chart that is to be displayed on the display 120. As shown in FIG. 1, processor module 111 sends the hierarchical chart to the rendering module 113 for rendering on the display 120. As shown in FIG. 1, the display 120 is used to display the hierarchical chart. For example, the hierarchical chart includes a number of nodes and links. Each of the nodes represents an entity and/or concept that is stored in the database. The links among the nodes represent the relationship among the nodes. When the hierarchical chart is displayed, the information that is to be displayed for each node is based on the level information stored in the status indicator 103. For example, if the status indicator 103 indicates that level 1 information is to be displayed, the processor module 111 provides names of personnel in the hierarchical chart for display; if the status indicator 103 indicates that level 2 information is to be displayed, the processor module 111 provides addresses of personnel in the hierarchical chart for display.

In various embodiments, the processor module 111 processes information from the database to determine, for each node, the association between view levels and information associated with each of the nodes. The association is stored by the system 100 (e.g., at status indicator 103) and is readily available for use. For example, view level 1 is associated with a first entry of nodes, view level 2 is associated with a first and second entries of nodes, and also on. In an alternative embodiment, view level 1 is associated with a first set of information for nodes, view level 2 is associated with a second set of information for nodes, and so on. Depending on the application, there may or may not be overlapping information between the first set and the second set of information for nodes. When the user changes view level, the processor module 111 retrieves the association information and display the nodes accordingly.

The controller module 110 includes a user interface module 112 for receiving user inputs. When user input 102 is received, the display 120 updates accordingly. For example, when user input 102 indicates that the view level should be changed, user input received by the user interface module 112 is processed by the processor module 111. The processor module 111 updates the level information stored in the status indicator 103, and retrieves additional information from the database if necessary. The processor module 111 then generates an updated hierarchical chart, where one or more nodes changed the level of information that is to be displayed. The updated hierarchical chart is then rendered by the rendering module 113 and displayed at the display 120. The detailed operation of displaying and updating hierarchical charts is described in more detail below.

FIGS. 2A-2D are simplified diagrams illustrating a graphical user interface according to embodiments of the present invention. These diagrams are merely an example, which should not unduly limit the scope of the claims. One of ordinary skill in the art would recognize many variations, alternatives, and modifications.

Figure 2A:
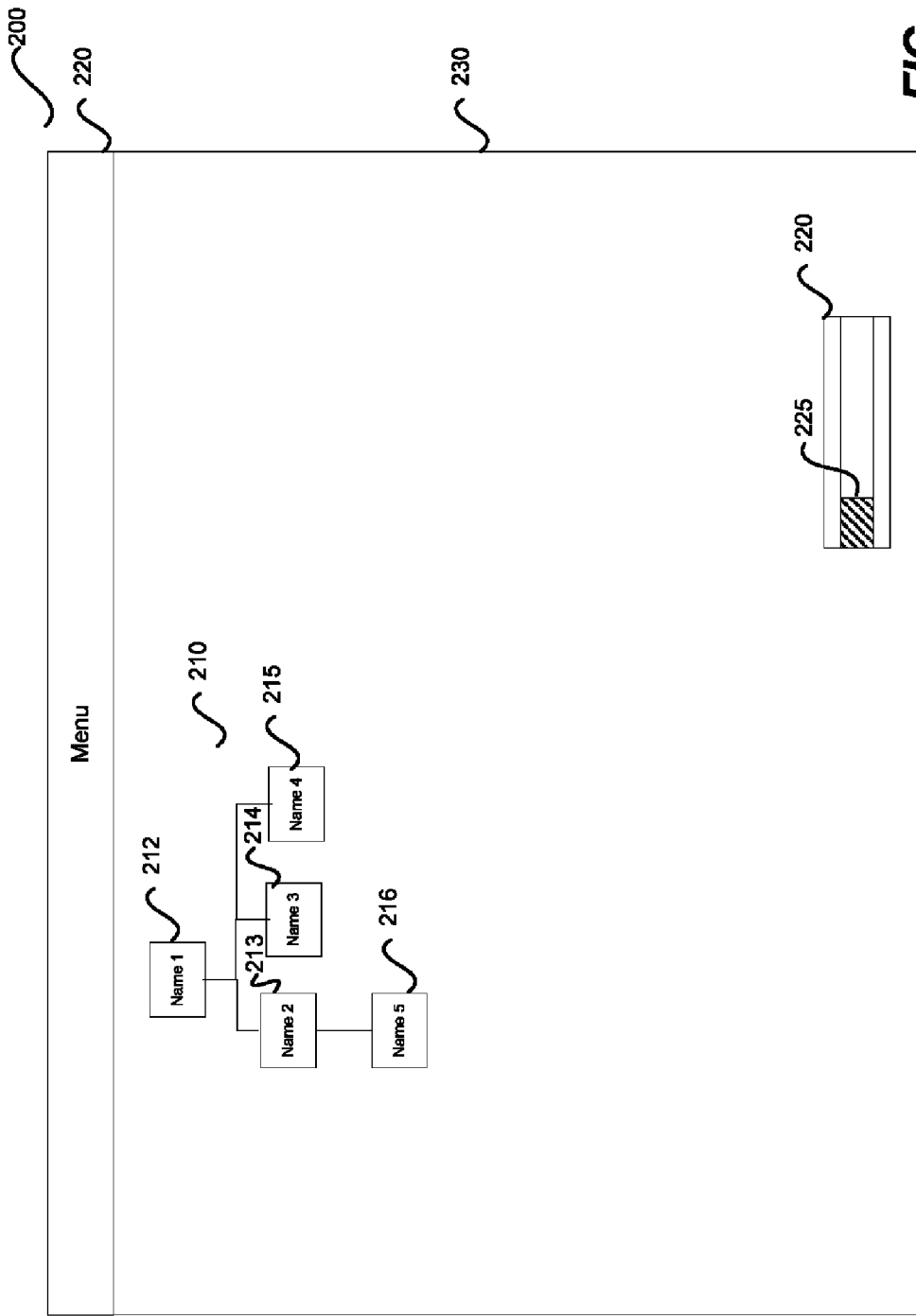
FIGS. 2A-2D are simplified diagrams illustrating a graphical user interface according to embodiments of the present invention.

A graphical user interface (GUI) 200 is shown in FIG. 2A. The GUI 200 contains a display region 230, a menu region 201, and a view control region 220. The display region 230 displays a hierarchical chart 210. The menu region 201 typically comprises various user-selectable controls for performing various operations (not shown in FIG. 2A) such as opening a file, copy and paste operations, etc. The operations may change depending on the specific application for which the GUI is displayed.

The display region 230 is used for displaying hierarchical information. For example, as depicted in FIG. 2A, display region 230 displays a hierarchical chart 210 comprising a plurality of nodes 212-216 and links connecting the nodes. Each node represents a concept or entity involved in the hierarchy depicted by hierarchical chart 210. The links between the nodes represent hierarchical relationships between the concepts or entities represented by the nodes. For example, if hierarchical chart 210 represents an organization personnel hierarchy, the nodes of hierarchical chart 210 may represent persons involved in the hierarchy and the links may represent hierarchical relationships between the personnel. For example, node 212 may represent a director, nodes 213-215 may represent managers under the director, and node 216 may represent an employee under the manager represented by node 213. Each node may display information related to the entity or concept represented by the node. For example, the nodes in FIG. 2A may display names (e.g., Name 1, Name 2, etc.) corresponding to the people represented by the nodes. It is to be understood that other information items may be displayed as well.

In one embodiment, the GUI 200 has a default setting as to which information is to be displayed at a node. For example, at the default setting corresponding to level 1, the name and/or other information associated with each node is displayed.

The view control region 220 as shown includes a slide button 225, where a user is able to adjust the view level for displaying the hierarchical chart 210. For example, a user is able to move the slide button 225 within the view control region 220 to change the view level. It is to be understood that other types of view control may be used as well and are contemplated by the present invention. For example, view control may include a textbox for entering view level in percentages, a drop down menu, clickable icons of view levels, and others. Depending on the application, view level may also be adjusted in other ways, such as using the scroll wheel of a mouse, keystrokes from a keyboard, etc. In a specific embodiment, the view control region 220 shows the view level in percentage value (e.g., 50% of the full size). In another embodiment, the view control region 220 modifies view level relatively. For example, each "click" or move of the slide button 225 moves the view level from one to the next (e.g., changing from view level 1 to view level 2 with one click; changing from view level 1 to view level 3 with two clicks).

Figure 2B:
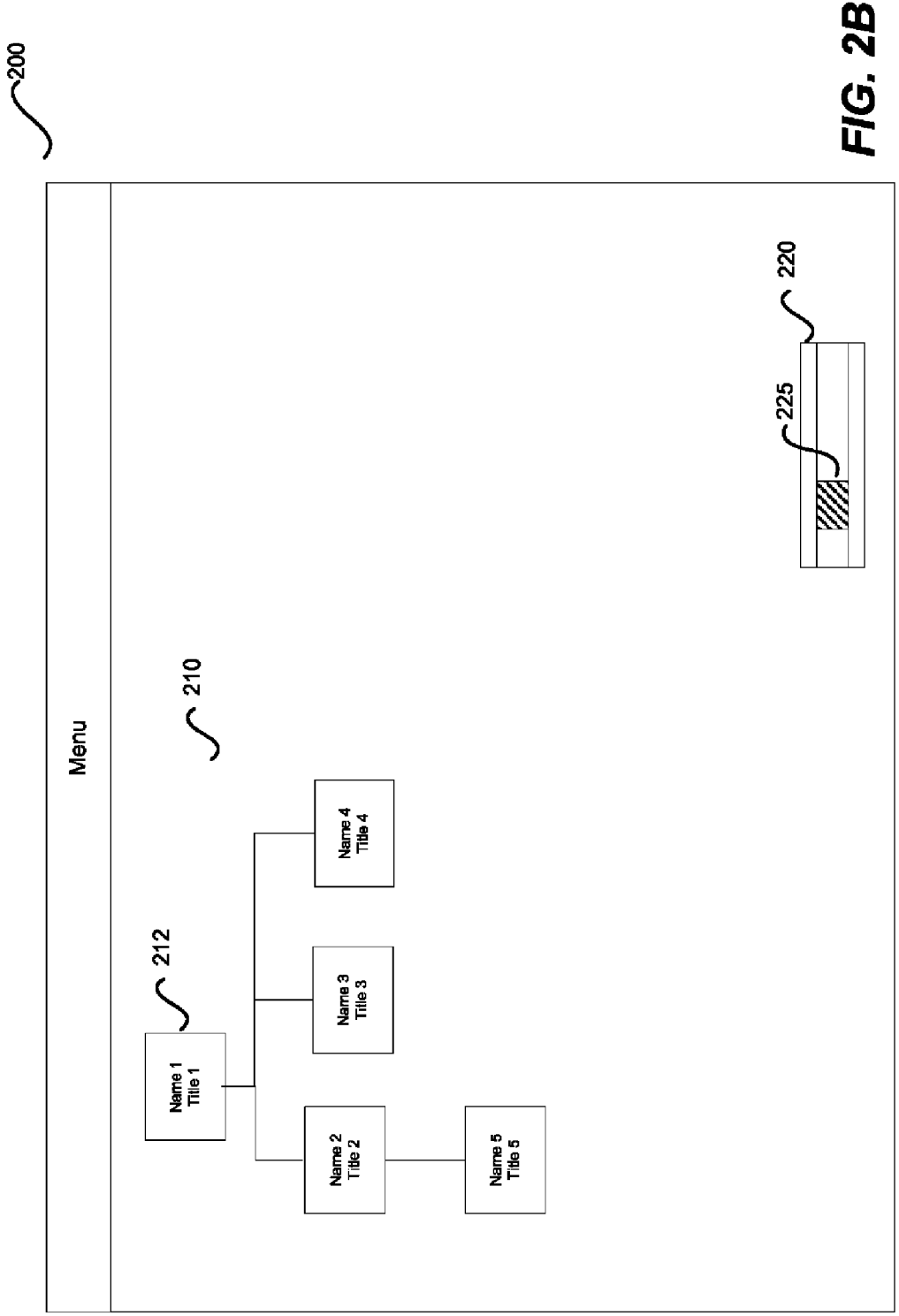

When a different view level is selected, the hierarchical chart 210 displays different information. As an example, FIG. 2B shows the hierarchical chart 210 that is displayed at a view level of 75% (compared to the 50% view level shown in FIG. 2A). At the view level of 75%, the nodes of the hierarchical chart 210 show more information than when the chart 210 is displayed at a view level of 50%. For example, instead of displaying just names, the nodes in the hierarchical chart 210 also display titles. As shown in FIG. 2B, node 212 displays "Name 1" and "Title 1." For example, both "Name 1" and "Title 1" are associated with the same person.

In addition to displaying different levels of detail, there can also be other visual differences when different view levels are selected. For example, hierarchical chart 210 is displayed at a larger size, when a view level of 75% is selected, than the size of hierarchical chart 210 displayed at a 50% view level. In an alternative embodiment, the size of hierarchical chart 210 does not change size at different view levels, but a different set of information associated with a node is displayed.

In an embodiment, the view control region 220 indicates the view level. In comparison to the view control region shown in FIG. 2A, the view control region 220 shown in FIG. 2B shows a view level at 75%, which is also indicated by the slide button 225 moved to a different position within the view control region 220.

Figure 2C:
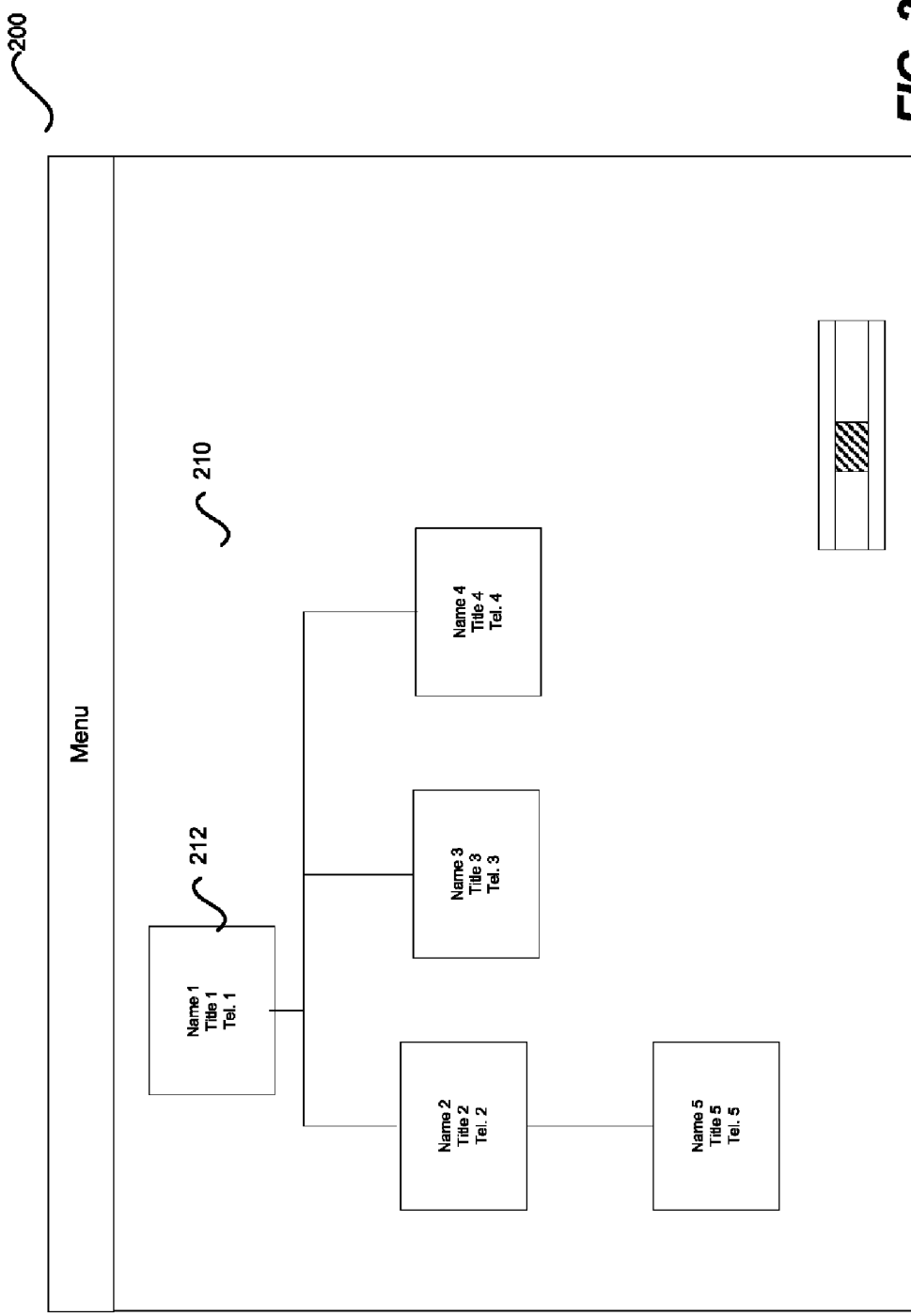

Depending on the application and/or the data to be displayed, a hierarchical chart may display two or more hierarchical levels. FIG. 2C shows the hierarchical chart 210 that is displayed at a view level of 100% (compared to the 50% view level shown in FIG. 2A and the 75% view level shown in FIG. 2B). At the view level of 100%, the nodes of hierarchical chart 210 show more information than when the chart 210 is displayed at 50% and 75% respectively. For example, instead of displaying just names and/or titles, the nodes in hierarchical chart 210 also displays telephone numbers. As shown in FIG. 2C, the node 212 displays "Name 1" and "Title 1" and "Tel.

1." For example, both "Name 1" and "Title 1" and "Tel. 1" are associated with the same person.

In an exemplary embodiment, the chart 210 is displayed at a larger size, when view level of 100% is selected, than the size of the chart 210 displayed at 50% and 75% view levels. In an alternative embodiment, the size of hierarchical chart 210 does not change size at different view levels. In an embodiment, the view control region 220 indicates the view level with both numerical value and slide position. In comparison to the view control region shown in FIGS. 2A and 2B, the view control region 220 shown in FIG. 2C shows that view level is at 100%, which is also indicated by the slide button 225 moved to a different position within the view control region 220.

Figure 2D:
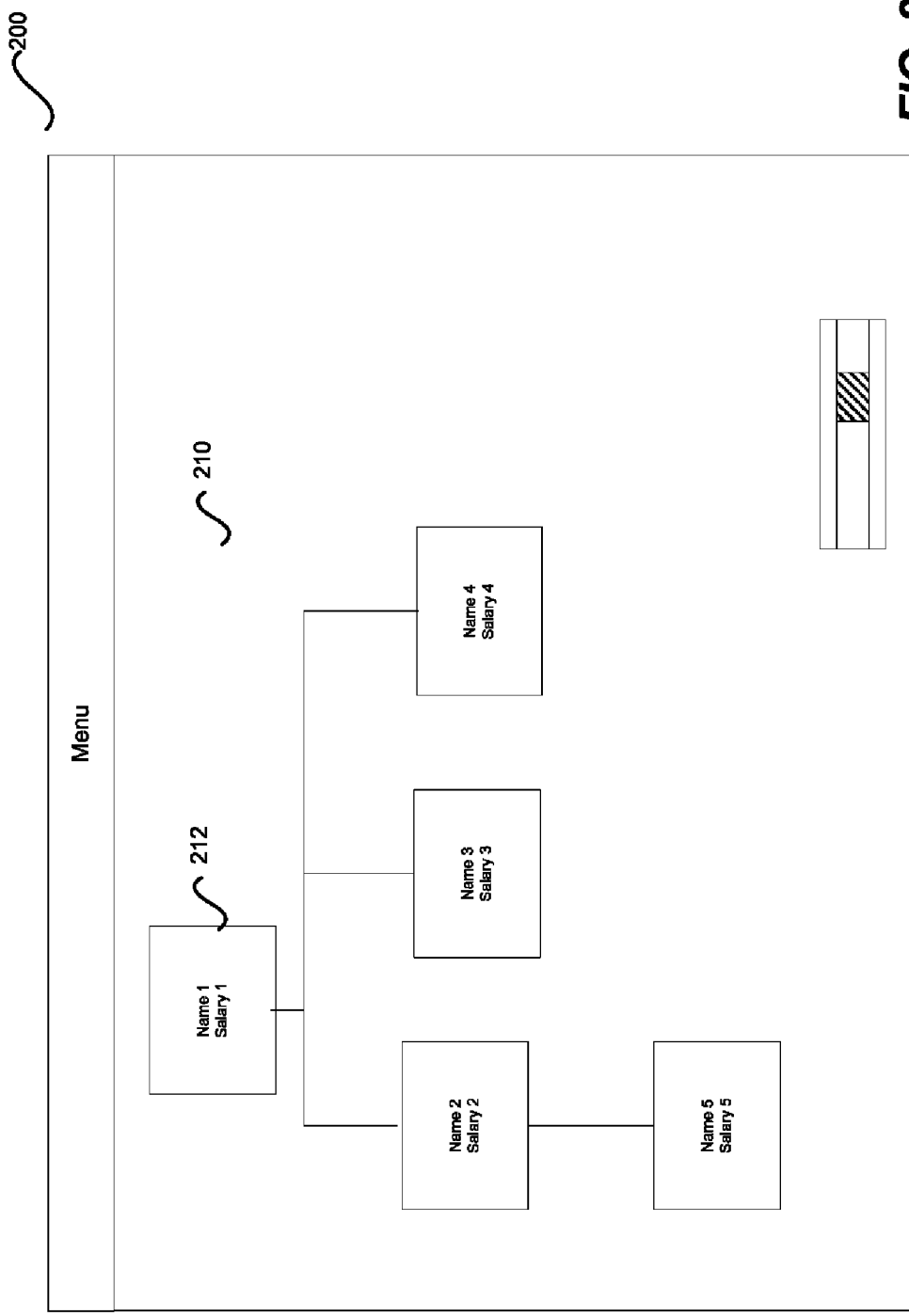

It is to be appreciated that embodiments of the present invention provides different modes when changing view levels. As shown in FIG. 2D, when he view level is changed, the display size and the amount of displayed information for each node do not change. Instead, the type of information that is displayed on each node is changed. As an example, when a different view level is selected as shown in FIG. 2D, each node displays "Name" and "Salary" which is different from the information displayed on the nodes in FIG. 2C. For example, "Name" and "Salary" information is a predetermined set of information that is associated with a view level, which can be selected by the user when changing view levels.

In FIGS. 2A-2D, the view control function is used to change the view levels of each node of hierarchical chart 210. According to various embodiments, the view control function described above can also be used to control the view level of individual nodes.

FIGS. 3A-3D are simplified diagrams illustrating a view control function used in a graphical user interface according to embodiments of the present invention. These diagrams are merely examples, which should not unduly limit the scope of the claims. One of ordinary skill in the art would recognize many variations, alternatives, and modifications.

Figure 3A:
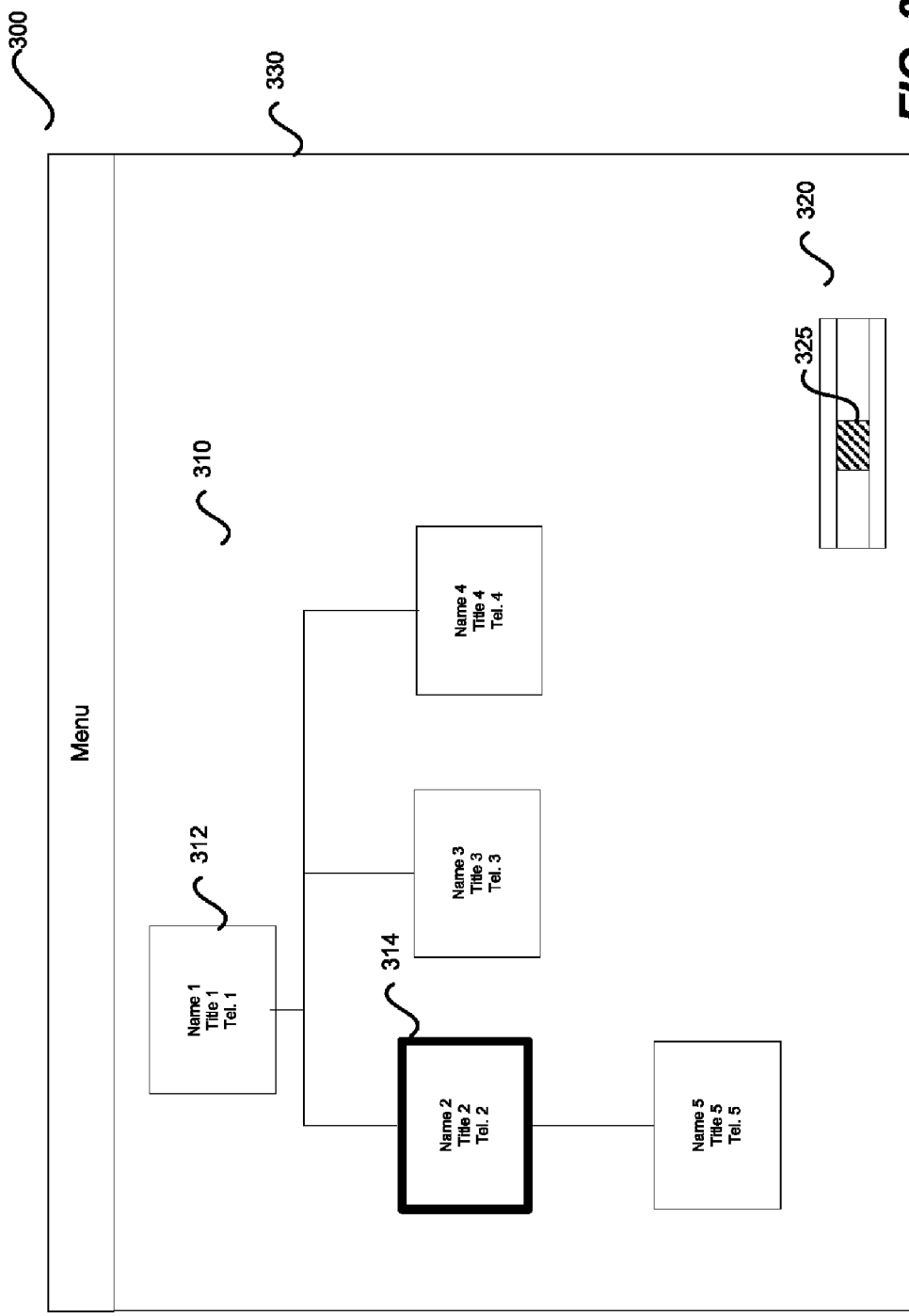
FIGS. 3A-3D are simplified diagrams illustrating a view control function used in a graphical user interface according to embodiments of the present invention.

As shown in FIG. 3A, a display 300 provides a graphical user interface which contains a display region 330 and a view control region 320. The display region 330 displays a hierarchical chart 310. The display region 330 is used for displaying hierarchical charts only and not used for providing menu control. In FIG. 3A, the display region displays the hierarchical chart 310, which as shown includes a plurality of nodes. As an example, each of the nodes corresponds to a record stored in a database system. The hierarchical display of the records is based on the relationships among these records as indicated by database. The nodes of hierarchical chart 310 as shown displays various types of information (e.g., name, title, telephone, etc.) based on the view level, but it is to be understood that other information items may be displayed as well. In a specific embodiment, the display 300 has a default setting for displaying information in a node. For example, at the default setting, name and/or other information associated with each node is displayed. As an example, name, title, and telephone information are displayed at 100% view level.

According to an embodiment, the view control functions of the graphical user interface can be applied globally or locally. When all of the nodes (i.e., the entire hierarchical chart 310) are selected, or none of the nodes are selected, the view control function applies view levels globally. In one embodiment, as shown in FIGS. 2B and 2C, when the view function changes view levels, all of the nodes change their view levels, and all the nodes are at the same view level. In another embodiment, the view function changes view levels one or more steps, each of the nodes change their view levels by one or more steps. For example, in this scenario where a first node is at level 2 and a second node is at level 3, one step of view level change indicated by the view function causes the first node to change to level 3 and the second node to level 4.

When one or more nodes in the hierarchical chart 310 are selected, the view control function only applies view level changes to the selected node. As shown in FIG. 3A, the node 314 is selected and the other nodes are not. As merely an example, the selected node is shown to be highlighted. Depending on the specific applications, other types of visual indication may be used to differentiate between selected and unselected nodes. For example, the selected node 314 has a thicker border than the unselected node 312.

In an embodiment, the view control functions determine whether one or more nodes are selected when receiving a user input for changing view level. For example, when the view control functions receive a user input that moves the slide button 325 along the view control region 320 to change view level, the view control function first determines whether there is one or more nodes that have been selected. In the case shown in FIG. 3A, the node 314 is selected. Having determined that only the node 314 is selected, the view control function only changes the view level for node 314.

Figure 3B:
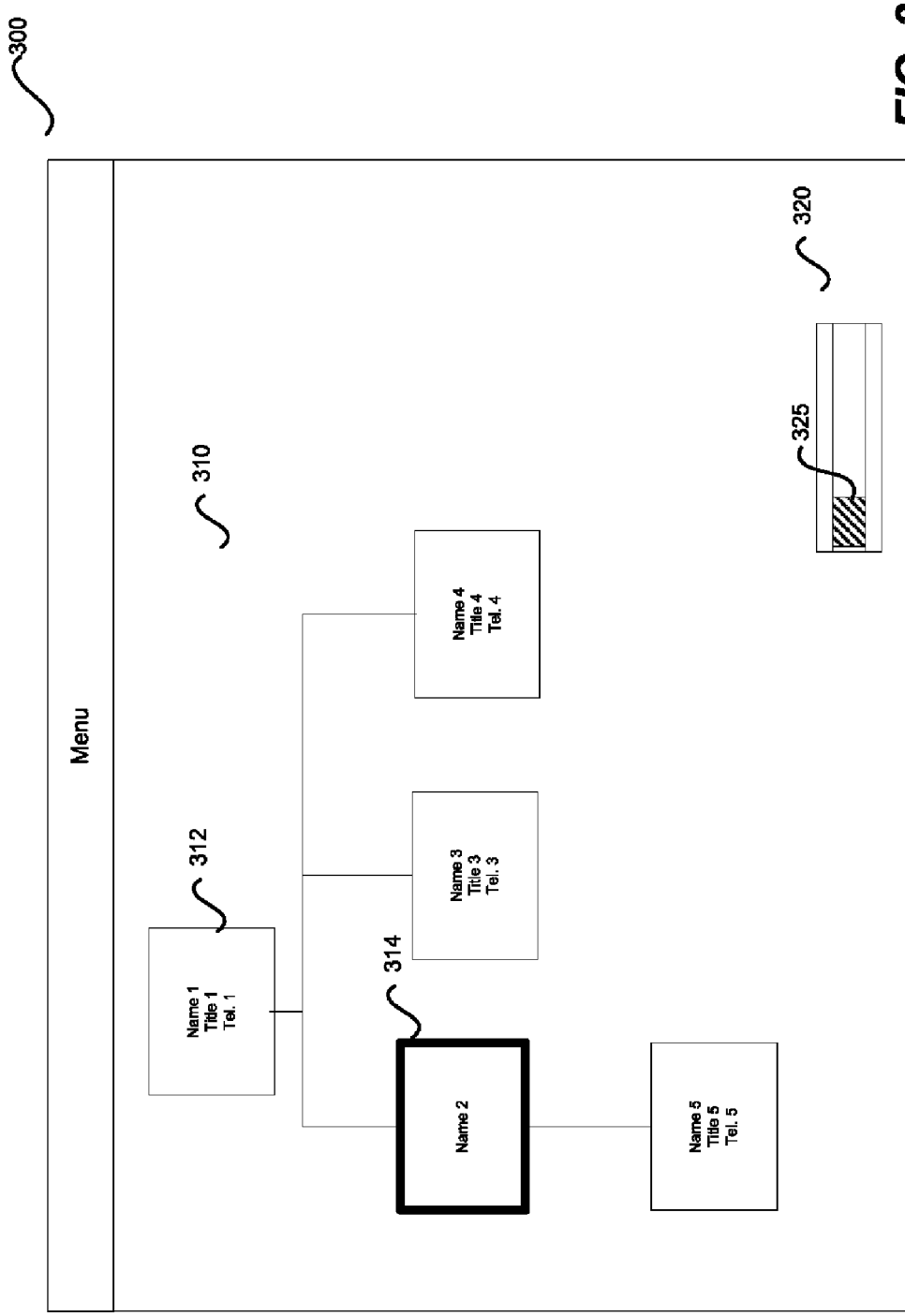
Figure 3C:
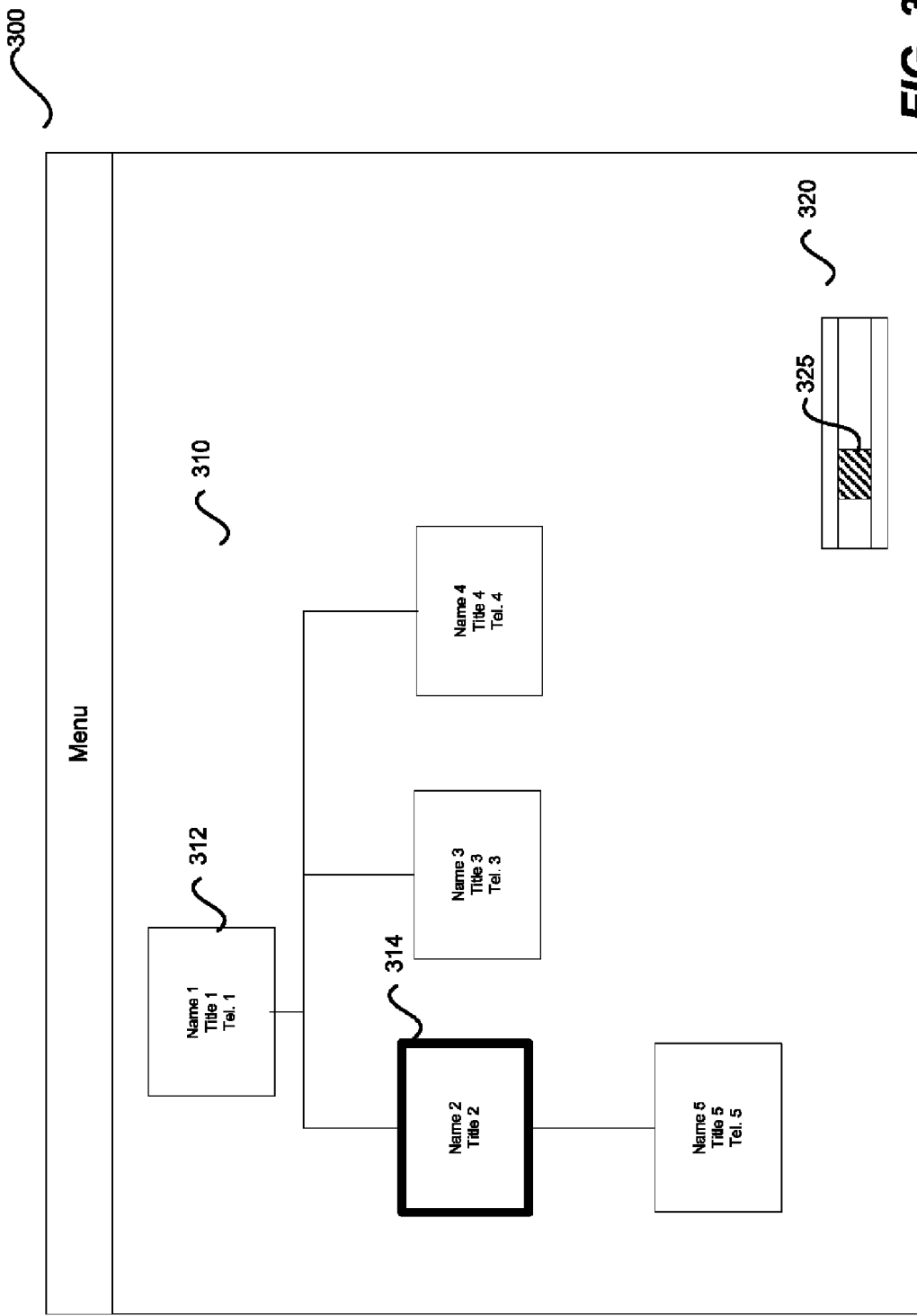

FIGS. 3B and 3C show that only node 314 changes its view level. FIG. 3B shows that when view level changes from 100% to 50%, only node 314 changes. As shown, node 314 only displays "Name 2," while the unselected nodes still display information that corresponds to a 100% view level. For example, the node 312 displays "Name 1" and "Title 1" and "Tel. 1." FIG. 3C shows that when the view level changes to 75%, only node 314 changes. As shown, node 314 only displays "Name 2" and "Title 2," while the unselected nodes still display information that corresponds to a 100% view level. For example, the node 312 displays "Name 1" and "Title 1" and "Tel. 1."

Figure 3D:
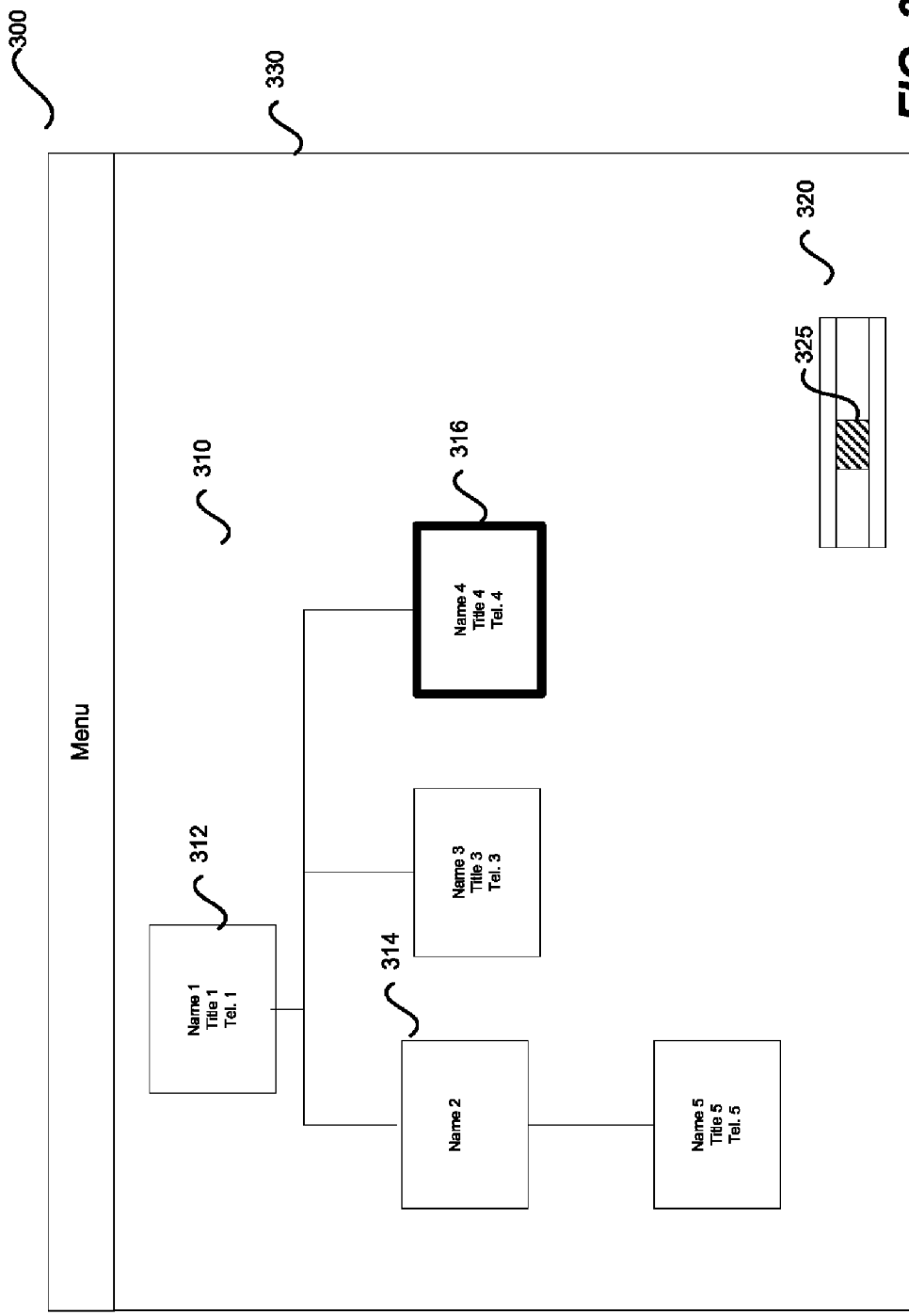

According to a specific embodiment, the view control region 320 provides visual indication for selected nodes. When none of the nodes is selected, the view control region 320 displays the view level for the entire hierarchical chart 310. In FIG. 3C, the view control region 320 displays the view level of the selected node 314, and both the view control button 325 and the position of the view control button 325 indicate that the view level is at 75%, even though the unselected nodes are at the view level of 100%. In FIG. 3D, the view control region 320 displays view level of the selected node 316, which is at 100%. As an example, the node 314 is still at a view level of 50%, showing "Name 2," while node 316 is at view level 100%.

Figure 4A:
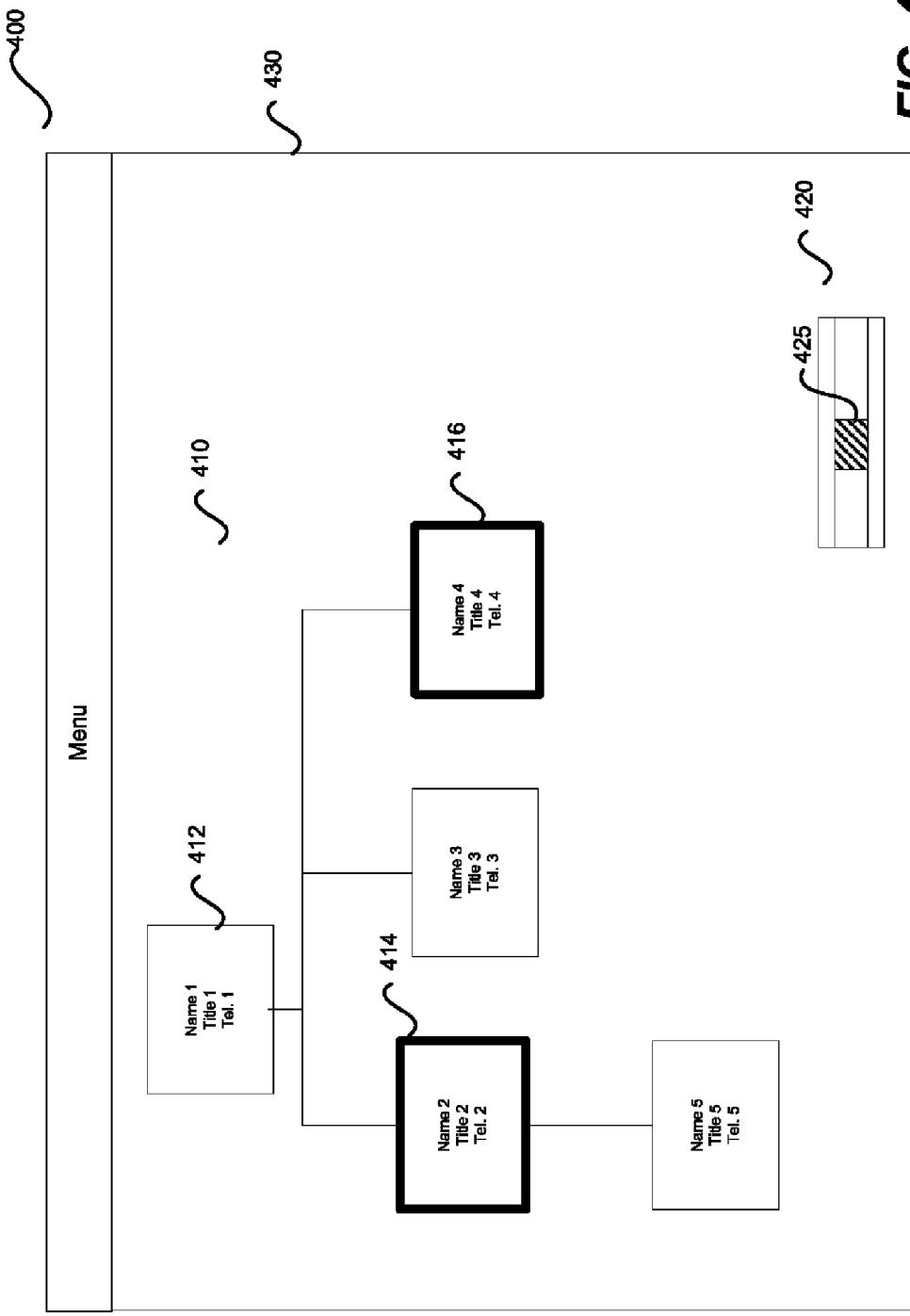
FIGS. 4A-4B are simplified diagrams illustrating a view of multiple nodes in a graphical user interface according to embodiments of the present invention.
Figure 4B:
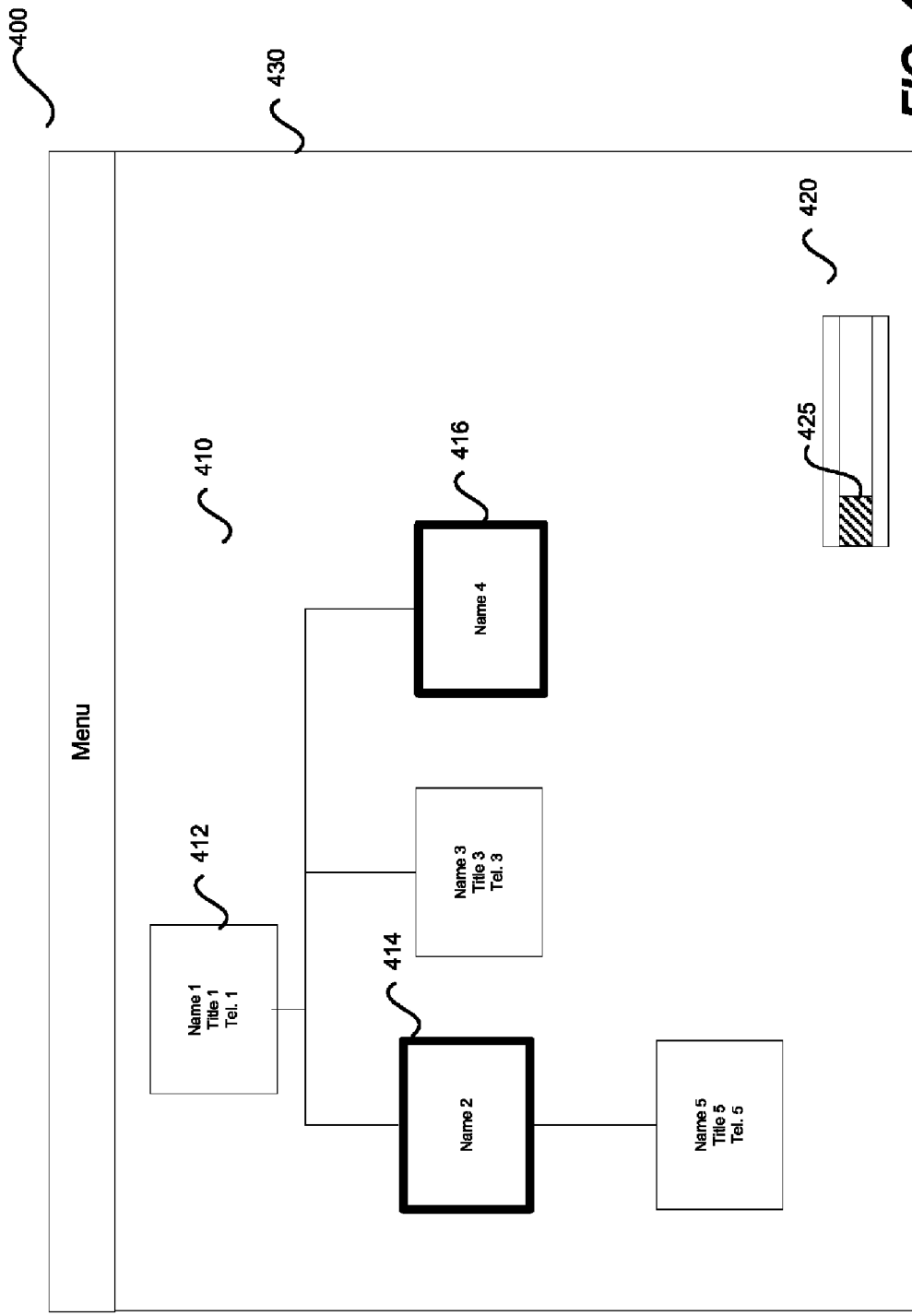

FIGS. 4A-4B are simplified diagrams illustrating a view of multiple nodes in a graphical user interface according to embodiments of the present invention. These diagrams are merely examples, which should not unduly limit the scope of the claims. One of ordinary skill in the art would recognize many variations, alternatives, and modifications.

As shown in FIG. 4A, a display 400 provides a graphical interface which contains a display region 430 and a view control region 420. The display region 430 displays a hierarchical chart 410. The display region 430 is used for displaying hierarchical charts only and not used for providing menu control. In FIG. 4A, the display region displays the hierarchical chart 410, which as shown includes a plurality of nodes. As an example, each of the nodes corresponds to a record stored in a database system. The hierarchical display of the records is based on the relationships among these records as indicated by database. The nodes of hierarchical chart 410 as shown display various information (e.g., name, title, telephone, etc.) based on the view level, but it is to be understood that other information items may be displayed as well. In a specific embodiment, the display 400 has a default setting for displaying information in a node. For example, at the default setting, name and/or other information associated with each node is displayed. As an example, name, title, and telephone information are displayed at a 100% view level.

As explained above, the view control functions of the graphical user interface can be applied globally or locally. When all of the nodes (i.e., the entire hierarchical chart 410) are selected, or none of the nodes are selected, the view control function applies view levels globally. For example, as shown in FIGS. 2B and 2C, when the view function changes view levels, all of the nodes change their view levels, and all the nodes are at the same view level. On the other hand, when a few nodes in the hierarchical chart 410 are selected, the view control function only applies view level changes to the selected nodes. As shown in FIG. 4A, nodes 414 and 416 are selected and the other nodes are not. As merely an example, the selected node is shown to be highlighted. Depending on the specific applications, other types of visual indication may be used to differentiate between selected and unselected nodes. For example, the selected nodes 414 and 416 are characterized by a thicker border than the unselected node 412.

FIG. 4B shows that when the view level changes from 100% to 50%, only the selected nodes 414 and 416 change. As shown, the nodes 414 and 416 only display "Name 2" and "Name 4" respectively, while the unselected nodes still plays information that correspond to 100% view level. For example, the node 412 displays "Name 1" and "Title 1" and "Tel. 1." The view control region 420 provides visual indication for selected nodes. When none of the nodes is selected, the view control region 420 displays the view level for the entire hierarchical chart 410. In FIG. 4B, the view control region 420 displays view level of the selected nodes 414 and 416, and both the view control button 425 and the position of the view control button 425 indicates that the view level is at 50%, even though the unselected nodes are at the view level of 100%.

Figure 5C:
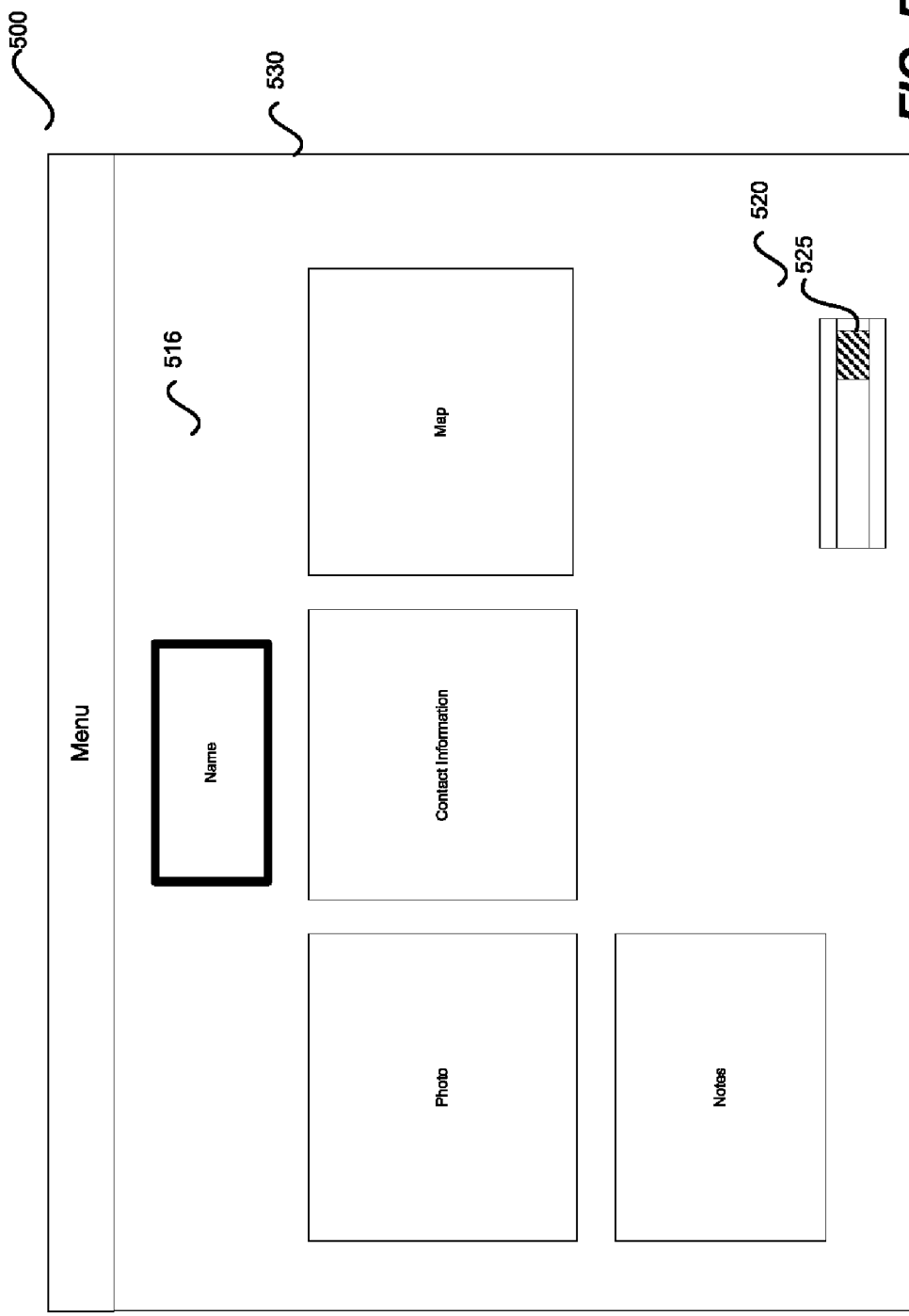

In various embodiments, the graphical user interface of the present invention provides a functionality to change the size of nodes in a hierarchical chart at different view levels. FIGS. 5A-5C are simplified diagrams illustrating a view control function with automatic size control according to embodiments of the present invention. These diagrams are merely examples, which should not unduly limit the scope of the claims. One of ordinary skill in the art would recognize many variations, alternatives, and modifications.

As shown in FIG. 5A, a display 500 provides a graphical interface which contains a display region 530 and a view control region 520. The display region 530 displays a hierarchical chart 510. The display region 530 is used for displaying hierarchical charts only and not used for providing menu control. In FIG. 5A, the display region displays the hierarchical chart 510, which as shown includes a plurality of nodes. As an example, each of the nodes corresponds to a record stored in a database system. The hierarchical display of the records is based on the relationships among these records as indicated by database. The nodes of hierarchical chart 510 as shown displays various information (e.g., name, title, telephone, etc.) based on the view level, but it is to be understood that other information items may be displayed as well. In a specific embodiment, the display 500 has a default setting for displaying information in a node. For example, at the default setting, name and/or other information associated with each node is displayed. As an example, name, title, and telephone information are displayed at a 100% view level.

When one or more nodes in the hierarchical chart 510 is selected, the view control function only applies view level changes to the selected node. As shown in FIG. 5A, the node 516 is selected and the other nodes are not. As merely an example, the selected node is shown to be highlighted. Depending on the specific applications, other types of visual indication may be used to differentiate between selected and unselected nodes. For example, the selected node 516 has a thicker border than the unselected node 512.

According to an embodiment, the view control function of the graphical user interface changes the display size of one or more nodes when the view level is changed. As shown in FIG. 5B, when the node 516 is selected and viewed at a view level of 150%, as indicated in the view control region 520, the size of node 516 as displayed is larger than (1) the size of the node 516 when displayed at the 100% view level; and (2) the unselected nodes. For example, the view functions determine that at 150% view level it is required to display the photograph of a contact and a large display area is needed. In a specific embodiment, the view control function of the graphical user interface also reduces the size of the other nodes so that the entirety of the hierarchical chart 510 is displayed within the display region 530.

In an embodiment, the view control function of the graphical user interface display hides the hierarchical chart 510 and displays only information associated with the selected node, as shown in FIG. 5C. As can be seen from FIG. 5C, only information items (e.g., photo, contact information, map, notes, etc.) associated with the selected node 516 are displayed, and other nodes are not visible within the display region 530. For example, by changing view level again (e.g., sliding the view control button 525 to cause the view level to change from 200% back to 100%), the unselected nodes become visible again within the display region 530, and the display size of the selected node 516 is reduced.

Figure 6:
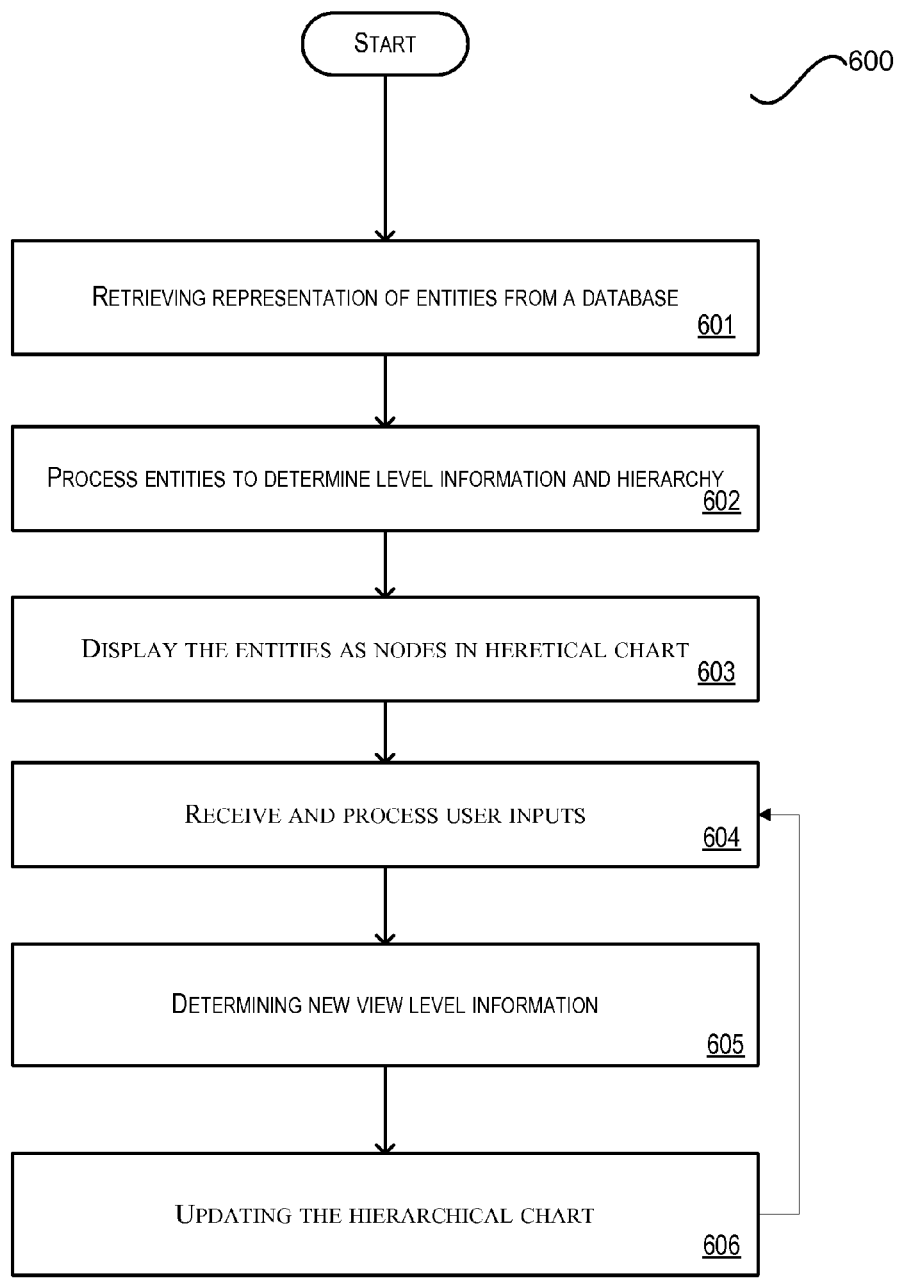
FIG. 6 is a simplified flow diagram illustrating a method for providing a graphical user interface according to an embodiment of the present invention.

FIGS. 6A-6B are simplified flow diagrams illustrating a method for providing a graphical user interface according to an embodiment of the present invention. These diagrams are merely an example, which should not unduly limit the scope of the claims. One of ordinary skill in the art would recognize many variations, alternatives, and modifications. For example, various steps illustrated in the flow diagrams may be added, removed, modified, replaced, rearranged, repeated, and/or overlapped.

In various embodiments, the processing of flowchart 600 may be implemented in software, hardware, or combinations thereof. Further, the processing of flowchart 600 may be encoded as program code stored on a machine-readable medium. In a particular embodiment, the processing of flowchart 600 may be carried out to actuate the GUI(s) described in FIGS. 2A through 5C.

At step 601, information related to representation of entities is retrieved from a database. For example, the database stores related data representation of entities that are related to one another. The database stores data that is to be displayed in a GUI described above as a hierarchical chart.

In certain embodiments, the database stores a plurality of entities. Each of the plurality of entities includes a plurality of entries, the plurality of entries corresponding to a set of view levels. In a specific embodiment, a processor retrieves the plural entities from a network source over a network interface. In certain embodiments, where the database is stored in a local computer, the processor retrieves and processes the entities from the network interface.

At step 602, the level information and hierarchical relationship for the entities stored in the database are processed. For example, the view levels are associated with the level of information to be displayed, which is explained above. In an embodiment, the view levels are predefined to associate with one or more entries of information associated with the records, and the predefined view levels are simply retrieved by a processor. In another embodiment, the association between the view levels and entries of information are determined by a processor when the database is processed.

At step 603, a hierarchical chart is displayed. The hierarchical chart displays a plurality of nodes, each of the nodes being a representation of an entity. The nodes are linked to one another based on the hierarchical relationship determined in step 602. Each node is displayed at a view level also determined in step 602. For example, a default view level is used for each node. In various embodiments, a user interface is also provided on the display. For example, the user interface is the GUI illustrated in FIGS. 2A through 5C and described above. Among other things, the user interface provides a control region (e.g., menu, toolbars, etc.) and a display region. In an embodiment, the control region includes a view control field.

At step 604, a user input is received from an input module and process. Depending on the application, the input module may include keyboard, mouse, and/or other input devices. For example, a user is able to use the input module to interact with the graphical user interface, such as selecting one or more nodes on a hierarchical chart on the display. The user input is then processed. For example, the user input includes the selection of one or more nodes and/or an indication for changing view level. The state of user selection and/or view level at which hierarchical chart is displayed is stored. For example, if the hierarchical chart is displayed at a 50% view level, this view level is stored and thus the system "remembers" at what level one or more nodes in a hierarchical chart are to be displayed. In an embodiment, a system stores the view level status for each of the nodes of the hierarchical chart. User selection is made by the user input module. As described above, one or more nodes can be selected. In certain embodiments, the selected nodes are displayed as highlighted nodes.

As an example, the user input module receives user input to change view level. In an embodiment, a user indicates a view level change by interacting with the GUI's view control region. In another embodiment, view level change is indicated by keyboard and/or mouse input from the user without interacting with the GUI's view control region.

At step 605, view level information is determined. The view level change is based on, for example, (1) nodes that are selected, (2) the view level to be changed from, (3) view level to be changed to, and (4) amount of information (or in a certain embodiment, what information) to be displayed based on the selected view level. As explained above, if none of the nodes of a hierarchical chart are selected, every node changes to the new view level. Similarly, if all of the nodes of a hierarchical chart are selected, every node changes to the new view level. On the other hand, if only few of the nodes are selected, only the selected nodes will change their view levels.

At step 606, the display is updated based on the view level change. For example, if a particular node is selected and the view level is indicated to be changed, the selected nodes display information at a view level different from that of other nodes. In a specific embodiment, the size of a selected node changes when the view level is changed. In another embodiment, the node changes size (e.g., enlarged to display more information) when the view level is changed. As described above and illustrated in FIGS. 5A-5B, the size of the unselected nodes in the display are changed when the view level for the selected nodes change.

The change of view level may be "absolute" or "relative." As explained, a step on the view level control in the "absolute" mode changes the selected node(s) to a predefined view level. In the relative mode, a single step on the view level control in the "absolute" mode changes the selected nodes by one level.

Figure 7:
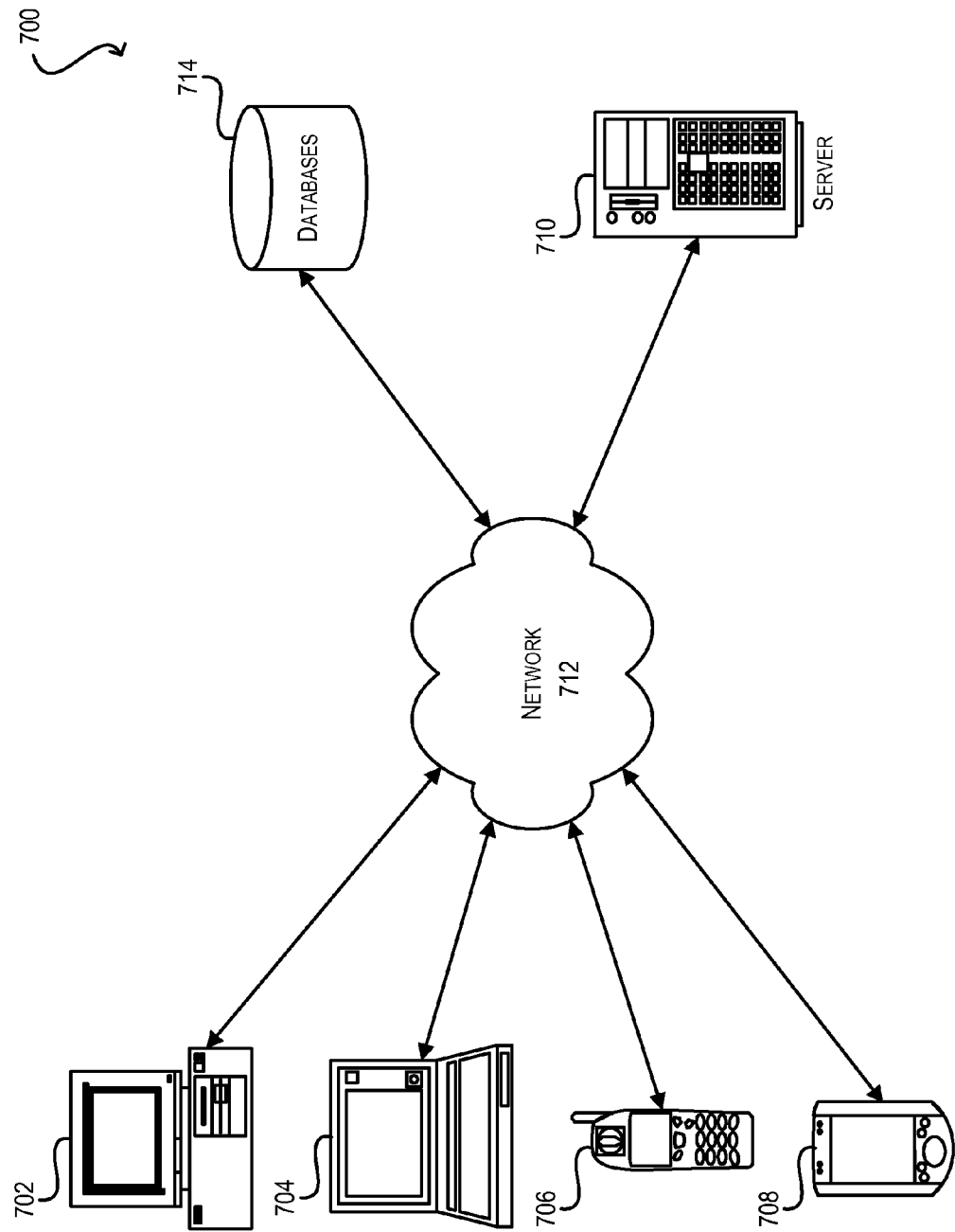
FIG. 7 is a simplified block diagram illustrating a physical system environment that may be used in accordance with an embodiment of the present invention.

FIG. 7 is a simplified block diagram illustrating physical components of a system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may be configured to run one or more components of a graphical user interface described above.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows™ Mobile and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic device capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any of a variety of server applications and/or mid-tier applications, including web servers, Java virtual machines, application servers, database servers, and the like. In various embodiments, server computer 710 is adapted to run one or more Web services or software applications described in the foregoing disclosure. For example, server computer 710 may provide the abovementioned graphical user interface and functionalities thereof.

As shown, client computing devices 702, 704, 706, 708 and server computer 710 are communicatively coupled via network 712. Network 712 may be any type of network that can support data communications using any of a variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/ or any other wireless protocol); and/or any combination of these and/or other networks. In various embodiments, the client computing devices 702, 704, 706, 708 and server computer 710 are able to access the database 714 through the network 712. In certain embodiments, the client computing devices 702, 704, 706, 708 and server computer 710 each has its own database.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or resident in) one or more of the computing devices 702, 704, 706, 708, or server computer 710. Alternatively, database 714 may be remote from any or all of the computing devices 702, 704, 706, 708, or server computer 710 and/or in communication (e.g., via network 712) with one or more of these. In one set of embodiments, database 714 may reside in a storage-area network (SAN) familiar to those skilled in the art. Similarly, any necessary files for performing the functions attributed to the computing devices 702, 704, 706, 708, or server computer 710 may be stored locally on the respective computer and/or remotely on database 714, as appropriate. In one set of embodiments, database 714 is a relational database, such as Oracle 10g™ available from Oracle Corporation that is adapted to store, update, and retrieve data in response to SQL-formatted commands. In various embodiments, the database 714 stores data that are displayed as hierarchical charts shown in FIGS. 2A through 5C.

Figure 8:
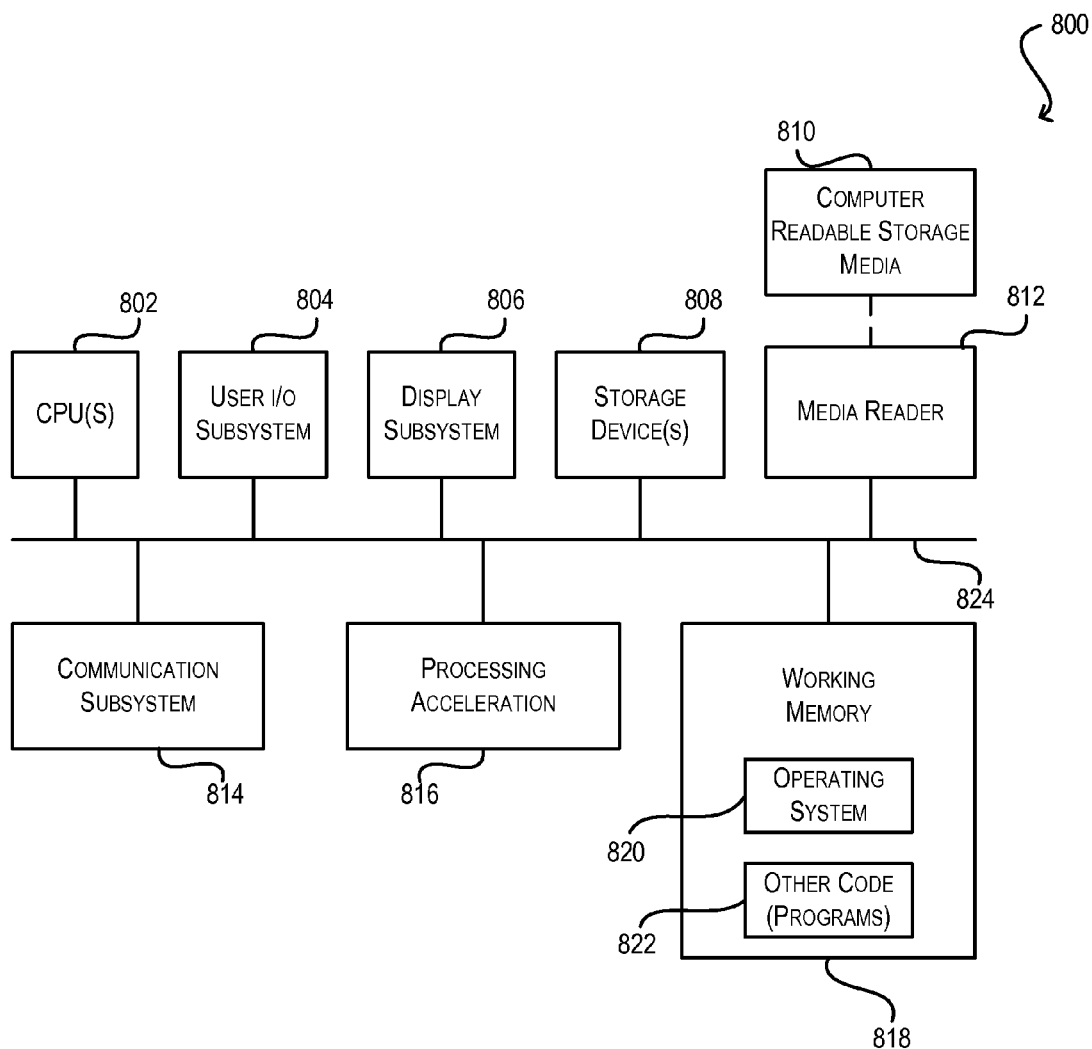
FIG. 8 is a simplified block diagram illustrating a computer system that may be used in accordance with an embodiment of the present invention.

FIG. 8 is a simplified block diagram illustrating the physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the computing devices 702, 704, 706, 708, or server computer 710 illustrated in system environment 700 described above. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). For example, the input devices 804 are used to receive user inputs for interacting with the GUI(s) illustrated in FIGS. 2A through 5C. Computer system 800 may also include one or more storage devices 808. By way of example, storage devices 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 808. For example, the central processing units 802 is configured to retrieve data from a database and process the data for displaying on a GUI.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage devices 808) comprehensively representing remote, local, fixed, and/or removable storage devices plus storage media for temporarily and/or more permanently containing computer-readable information. Communications system 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable code and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. In a computer system having a processor, a graphical user interface including a display and a user interface device communicatively coupled to the processor, the processor being adapted to execute codes stored on a computer-readable storage medium, the computer-readable storage medium comprising:

code for obtaining information from a database, the database being stored in a memory, the database being configured to provide representation for a plurality of entities, the plurality of entities being related to one another according to a hierarchy, each of the plurality of entities includes a plurality of entries, the plurality of entries being corresponding to a set of view level, the set of view levels including a first view level and a second view level and a third view level, the plurality of entities including a first entity and a second entity and a third entity, the first entity including a first entry and a second entry and a third entry, the second entity including a fourth entry and a fifth entry and a sixth entry, the third entity including a seventh entry and an eighth entry and a ninth entry;

code for processing user inputs from a user input module;

code for providing a user interface on the display, the user interface including a control region and a display region, the control region including a view control field;

code for displaying the plurality of entities as nodes on a hierarchical chart at the first view level obtained by the processor on the display region of the user interface, the nodes including a first node representing the first entity, a second node representing the second entity, and a third node representing the third entity, the first entry and the fourth entry and the seventh entry being shown at the first view level, one or more nodes being selectable by a user using the user input module;

code for storing view control information for each of the nodes;

code for storing selection states of the plurality of nodes if one or more of the nodes are selected;

code for processing a first user input from the user input module, the first user input indicating the second view level being selected;

code for displaying each of the plurality of nodes at the second view level if the selection states indicate that none the plurality of nodes is selected;

code for displaying the first node at the second view level and the second node at the first view level if the selection states indicate that only the first node is selected, the first entry and the second entry being displayed at the second view level, the fifth entry being invisible at the first view level, the fourth entry being displayed at the first view level;

code for displaying the first node and the second node at the second view level and the third node at the first view level if the selection states indicate that only the first node and the second node are selected, the first entry and the second entry and the fourth entry and the fifth entry being displayed at the second view level, the seventh entry being display at the first view level, the eighth entry being invisible at the first view level; and code displaying the first node at the third view level and the second node at the first view level if the third view level is selected the selection states indicate that the first node is selected, the first entry and the second entry and the third entry being displayed at the third view level, the sixth entry being invisible.

2. The computer-readable storage medium of claim 1 wherein the first node is characterized by a first display size at the first view level and a second display size at the second view level.

3. The computer-readable storage medium 1 wherein the first node is characterized by a same display size at the first view level and the second view level.

4. The computer-readable storage medium 1 further comprising code for providing a indication the selected states of the plurality of nodes.

5. The computer-readable storage medium 1 wherein the user input module comprises a mouse, and a keyboard.

6. The computer-readable storage medium of claim 1 wherein the computer memory comprises a hard disk, a network drive, a RAID drive, or a flash drive.

7. The computer-readable storage medium of claim 1 where each of plurality of the plurality of information items comprises text and picture associated with a person, the information comprising contact information.

8. The computer-readable storage medium of claim 1 further comprising providing a network interface wherein the processor is adapted to obtain information using the network interface.

9. The computer-readable storage medium of claim 1 wherein the database comprises a relational database, a hierarchical database, a network database, an online database, or an object database.

10. The computer-readable storage medium of claim 1 wherein the view control field comprises a sliding button for selecting view levels.

11. The computer-readable storage medium of claim 1 wherein the view control field comprises a dropdown menu for selecting view levels.

12. The computer-readable storage medium of claim 1 wherein the view control field comprises a text field for entering view level.

13. The computer-readable storage medium of claim 1 wherein the view control field displays the selected view level.

14. The computer-readable storage medium of claim 1 wherein the view levels further comprising a fourth view level, wherein the first node is displayed within essentially an entire area of the display region if the first node selected to be displayed at the fourth view level.

15. A method for providing a user interface wherein information items are displayed in an hierarchy, the method comprising:

providing a database, the database being configured to provide representation for a plurality of entities, the plurality of entities being related to one another according to a hierarchy, each of the plurality of entities including a plurality of entries, the plurality of entities including a first entity and a second entity and a third entity, the first entity including a first entry and a second entry and a third entry, the second entity including a fourth entry and a fifth entry and a sixth entry, the third entity including a seventh entry and an eighth entry and a ninth entry;

determining a correspondence between the plurality of entries and a set of view levels, the set of view levels including a first view level and a second view level and a third view level;

providing a display;

providing a user input module;

providing a processor;

obtaining the plurality of entries from the database by the processor;

providing a user interface on the display, the user interface including a control region and a display region, the control region including a view control field;

displaying the plurality of entries at the first view level obtained by the processor on the display region of the user interface as nodes of a hierarchical chart, a first node corresponding to the first entity, a second node corresponding to the second entity, and a third node corresponding to the third entity, the first entry and the fourth entry and the seventh entry being shown at the first view level, one or more nodes being selectable by a user using the user input module;

storing selection states of the plurality of nodes if one or more of the nodes are selected;

receiving a first user input from the user input module, the first user input indicating the second view level being selected;

displaying each of the plurality of nodes at the second view level if the selection states indicate that none of the plurality of nodes is selected;

displaying the first node at the second view level and the second node at the first view level if the selection states indicate that only the first node is selected, the first node and the second node being displayed at the second view level, the fifth entry being invisible at the first view level, the fourth entry being displayed at the first view level;

displaying the first node and the second node at the second view level and the third node at the first view level if the selection states indicate that only the first node and second node are selected, the first entry and the second entry and the fourth entry and the fifth entry being displayed at the second view level, the seventh entry being displayed at the first view level, the eighth entry being invisible at the first view level; and displaying the first node at the third view level and the second node at the first view level if the third view level is selected the selection states indicate that the first node is selected, the first entry and the second entry and the third entry being displayed at the third view level, the sixth entry being invisible.

16. A system for providing a graphical user interface, the system comprising:
 a user input module;
 a memory;
 a processor, the processor is configured to obtain representation for a plurality of entities from a database, the plurality of entities being related to one another according to a hierarchy, each of the plurality of entities includes a plurality of entries, the plurality of entries being corresponding to a set of view level, a first set of information being associated with a first view level, a second set of information being associated with a second view level;
 a display, the display is configured to provide a user interface on the display, the displaying including a control region and a display region, the control region including a view control field, the display being adapted to displaying the plurality of entities as nodes on a hierarchical chart at the first view level obtained by the processor on the display region of the user interface, a first level of information of the nodes being displayed at the first view level, one or more records being selectable by a user using the user input module;
 wherein:
 the memory stores selection states of the plurality of nodes if one or more of the recorded are selected;
 the user input module is adapted to receive a first user input indicating the second view level being selected;
 the display is updated for displaying each of the plurality of node at the second view level if the selection states indicate that none of the plurality of records is selected;
 the display is updated for displaying a first node at the second view level and a second node at the first view level if the selection states indicate that only the first record is selected.

17. The system of claim 16 wherein the database is stored in the memory.

18. The system of claim 16 further comprising a network interface, the database being accessible to the system using the network interface.

19. The system of claim 16 wherein the processor determines which of the nodes change view level.

20. The system of claim 16 wherein the processor determines what information is to be displayed at the first view level.

* * * * *

UNITED STATES PATENT AND TRADEMARK OFFICE
CERTIFICATE OF CORRECTION

| | |
|---|---|
| PATENT NO. | : 8,161,413 B2 |
| APPLICATION NO. | : 12/563069 |
| DATED | : April 17, 2012 |
| INVENTOR(S) | : Chen et al. |

Page 1 of 1

It is certified that error appears in the above-identified patent and that said Letters Patent is hereby corrected as shown below:

On page 3, in column 2, under "Other Publications", line 10, delete "Defure" and insert -- Defura --, therefor.

In column 3, line 24, delete "none the" and insert -- none of the --, therefor.

In column 17, line 42, in Claim 1, delete "none the" and insert -- none of the --, therefor.

In column 18, line 1, in Claim 3, delete "medium 1" and insert -- medium of claim 1 --, therefor.

In column 18, line 4, in Claim 4, delete "medium 1" and insert -- medium of claim 1 --, therefor.

In column 18, line 7, in Claim 5, delete "medium 1" and insert -- medium of claim 1 --, therefor.

In column 18, line 13, in Claim 7, delete "plurality of the plurality of".

Signed and Sealed this
Twenty-fifth Day of September, 2012

David J. Kappos
*Director of the United States Patent and Trademark Office*